US009239217B2

(12) United States Patent
Delneo et al.

(10) Patent No.: US 9,239,217 B2
(45) Date of Patent: Jan. 19, 2016

(54) RETRACTABLE TAPE RULE ASSEMBLY LOCKING SYSTEM

(71) Applicant: STANLEY BLACK & DECKER, INC., New Britain, CT (US)

(72) Inventors: John Delneo, Middletown, CT (US); Vincent Cook, Milford, CT (US); Joseph R. Martone, Bristol, CT (US); John C. Murray, Canton, CT (US)

(73) Assignee: STANLEY BLACK & DECKER, INC., New Britain, CT (US)

( * ) Notice: Subject to any disclaimer, the term of this patent is extended or adjusted under 35 U.S.C. 154(b) by 203 days.

(21) Appl. No.: 14/015,408

(22) Filed: Aug. 30, 2013

(65) Prior Publication Data

US 2014/0290085 A1      Oct. 2, 2014

Related U.S. Application Data

(60) Provisional application No. 61/806,499, filed on Mar. 29, 2013.

(51) Int. Cl.
*G01B 3/10* (2006.01)
(52) U.S. Cl.
CPC ........ *G01B 3/1005* (2013.01); *G01B 2003/101* (2013.01); *G01B 2003/1015* (2013.01)
(58) Field of Classification Search
CPC ..................... G01B 3/1041; G01B 2003/1089; G01B 3/1084; G01B 2003/1048; G01B 2003/1007; G01B 3/1005; G01B 3/1056; G01B 3/1071
USPC .................................................... 33/767, 757
See application file for complete search history.

(56) References Cited

U.S. PATENT DOCUMENTS

| 655,052 A | 7/1900 | Brunello |
|---|---|---|
| 2,919,676 A | 1/1960 | Schneider |
| 3,435,529 A | 4/1969 | Quenot |
| 3,862,761 A | 1/1975 | Conley |

(Continued)

FOREIGN PATENT DOCUMENTS

| EP | 0 093 445 | 11/1983 |
|---|---|---|
| EP | 0 464 725 | 1/1992 |

(Continued)

OTHER PUBLICATIONS

Extended Search Report, including the Search Opinion, issued for European Patent Application No. 14161667.2, dated Jun. 26, 2014.

*Primary Examiner* — Yaritza Guadalupe-McCall
(74) *Attorney, Agent, or Firm* — Pillsbury Winthrop Shaw Pittman LLP

(57) ABSTRACT

The present disclosure relates to a retractable tape rule assembly locking system. The system comprises an elongated tape rule blade, a reel, a biasing spring, a stop assembly, a stop surface, a stop assembly locking device, a housing assembly, and/or other components. The stop assembly is configured to selectively engage the elongated tape rule blade to maintain the elongated tape rule blade in the extended position. The stop assembly is configured to be moveable between a default position and an open position by a user. While in the default position, the stop assembly engages the elongated tape rule blade to prevent retraction of the elongated tape rule blade. The stop surface is associated with the reel and configured to engage the stop assembly to prevent rotation of the reel to retract the elongated tape rule blade.

37 Claims, 17 Drawing Sheets

(56) References Cited

U.S. PATENT DOCUMENTS

| | | | |
|---|---|---|---|
| 3,953,696 | A | 4/1976 | Reimann et al. |
| 4,135,682 | A | 1/1979 | Mizuno |
| 4,153,996 | A | 5/1979 | Rutty |
| 4,185,792 | A | 1/1980 | Weman |
| 4,537,363 | A | 8/1985 | Thomas |
| 4,651,946 | A | 3/1987 | Anthony et al. |
| 4,729,524 | A | 3/1988 | Befort et al. |
| 5,245,761 | A | 9/1993 | Waldherr |
| 5,400,521 | A | 3/1995 | Waldherr |
| 5,483,926 | A | 1/1996 | Bogdahn |
| 5,762,281 | A | 6/1998 | Foley |
| 5,887,550 | A | 3/1999 | Levine et al. |
| 6,148,773 | A | 11/2000 | Bogdahn |
| 6,199,785 | B1 | 3/2001 | Paugh |
| 6,276,071 | B1 | 8/2001 | Khachatoorian |
| 6,467,182 | B2 | 10/2002 | Usami |
| 6,595,451 | B1 | 7/2003 | Kang et al. |
| 6,643,948 | B1 | 11/2003 | Seymour |
| 6,836,975 | B2 | 1/2005 | Lin |
| 7,010,865 | B2 | 3/2006 | Lin |
| 7,065,896 | B1 * | 6/2006 | Lin ................... 33/767 |
| 7,178,257 | B2 | 2/2007 | Kang et al. |
| 7,374,123 | B2 | 5/2008 | Han |
| 7,703,216 | B2 * | 4/2010 | Huang ............... 33/767 |
| 7,784,728 | B2 | 8/2010 | Shi |
| 7,896,281 | B2 | 3/2011 | Bleshoy |
| 8,151,735 | B1 | 4/2012 | McCrocklin |
| 8,215,027 | B2 * | 7/2012 | Kang ............... 33/761 |
| 8,347,824 | B2 | 1/2013 | Marshall |
| 2004/0021028 | A1 | 2/2004 | Lee |
| 2004/0035017 | A1 | 2/2004 | Yang |
| 2006/0156571 | A1 | 7/2006 | Lin |
| 2007/0056182 | A1 * | 3/2007 | Di Bitonto et al. ....... 33/767 |
| 2007/0186433 | A1 * | 8/2007 | Campbell ............ 33/767 |
| 2008/0034604 | A1 * | 2/2008 | Critelli et al. ......... 33/767 |
| 2009/0064526 | A1 * | 3/2009 | Farnworth et al. ....... 33/767 |
| 2010/0064540 | A1 * | 3/2010 | Huang ............... 33/767 |
| 2010/0299947 | A1 * | 12/2010 | Levick et al. ......... 33/767 |
| 2012/0131810 | A1 * | 5/2012 | Hunsberger et al. ...... 33/767 |
| 2013/0008392 | A1 | 1/2013 | Holmstrom |
| 2014/0290085 | A1 * | 10/2014 | Delneo et al. ......... 33/701 |

FOREIGN PATENT DOCUMENTS

| | | |
|---|---|---|
| EP | 1 788 343 A2 | 5/2007 |
| JP | 2008-039732 | 2/2008 |

* cited by examiner

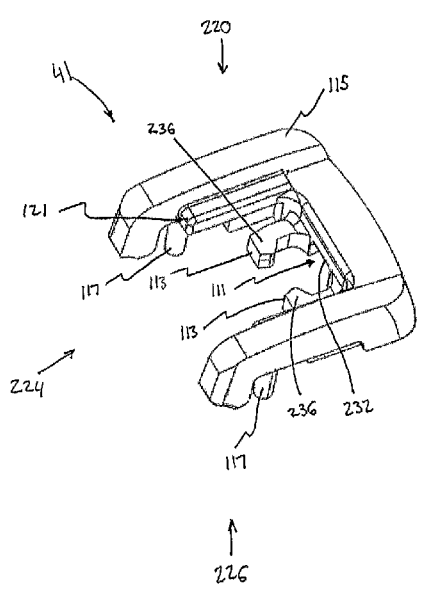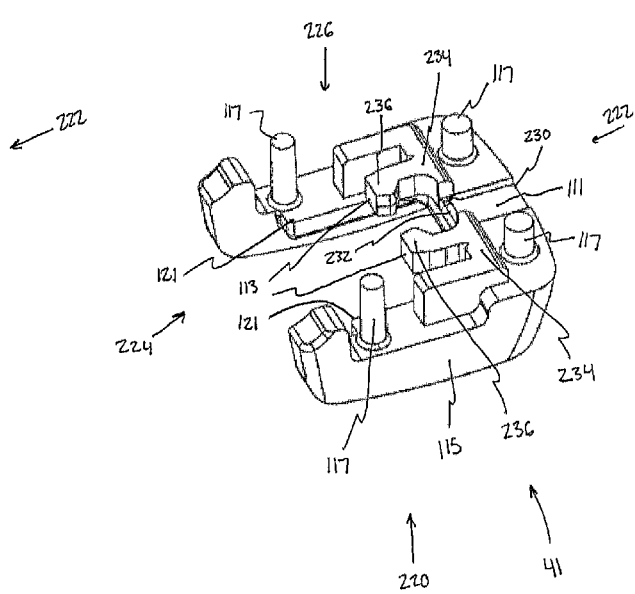
FIG. 7C
FIG. 7D

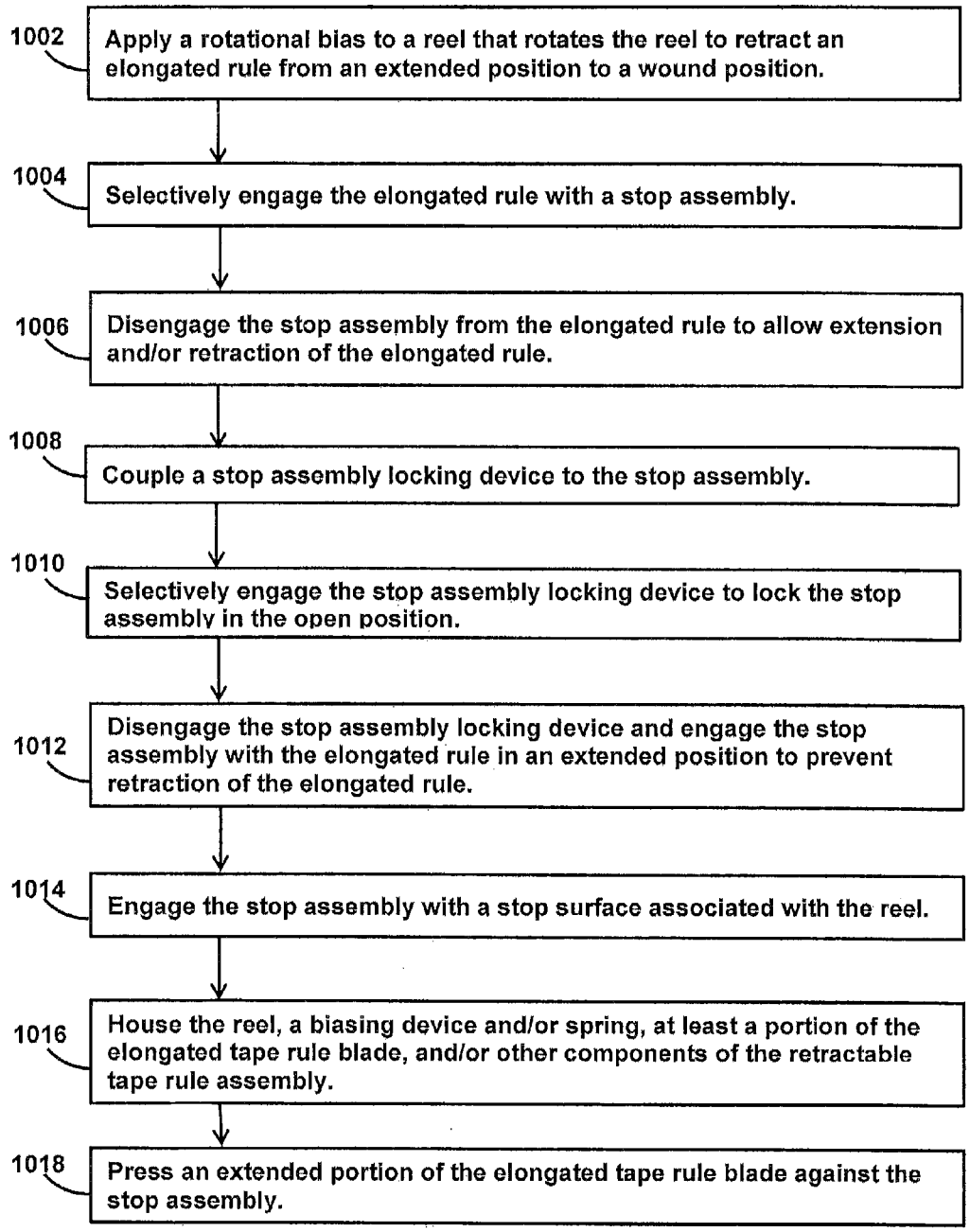

RETRACTABLE TAPE RULE ASSEMBLY LOCKING SYSTEM

CROSS-REFERENCE TO RELATED APPLICATIONS

This application claims priority to U.S. Provisional Patent Application No. 61/806,499 filed Mar. 29, 2013, entitled "Retractable Tape Rule Assembly Locking System", which is hereby incorporated by reference.

BACKGROUND OF THE INVENTION

1. Field of the Invention

The present disclosure relates to a retractable tape rule assembly locking system.

2. Description of Related Art

Retractable tape rule assemblies are well known. There is a need in the tool industry for retractable tape rule assemblies with improved utility.

SUMMARY OF EMBODIMENTS OF THE INVENTION

One aspect of the present disclosure relates to a retractable tape rule assembly locking system. The system comprises an elongated tape rule blade, a reel, a biasing spring, a stop assembly, a stop surface, a stop assembly locking device, a housing assembly, and/or other components. The elongated tape rule blade is configured for measurement. The elongated tape rule blade includes measurement indicia. The reel is configured to retract the elongated tape rule blade from an extended position to a wound position. The biasing spring is configured to apply a rotational bias to the reel that rotates the reel to retract the elongated tape rule blade into the wound position. The stop assembly is configured to selectively engage the elongated tape rule blade to maintain the elongated tape rule blade in the extended position or the wound position. The stop assembly is configured to be moveable between a default position and an open position by a user. While the stop assembly is in the default position, the stop assembly engages the elongated tape rule blade to prevent retraction of the elongated tape rule blade. While the stop assembly is in the open position, the stop assembly is disengaged from the elongated tape rule blade to allow retraction and extension of the elongated tape rule blade. The stop surface is associated with the reel and configured to engage the stop assembly to prevent rotation of the reel to retract the elongated tape rule blade. The stop surface is configured to engage the stop assembly responsive to the stop assembly being in the default position and responsive to less than a pre-determined length of the elongated tape rule blade being in the wound position. The housing assembly is configured to house the reel, the spring, at least a portion of the elongated tape rule blade, and/or other components.

In some embodiments, the stop assembly includes a lever, a wedge, a pin, and/or other components. In some embodiments, the stop surface includes a disk having at least one hook configured to engage the stop assembly. The at least one hook may be formed along the circumference of the disk. The pin of the stop assembly is configured to receive the engagement by the at least one hook responsive to the stop assembly being in the default position and responsive to less than the pre-determined length of the elongated tape rule blade being in the wound position. In some embodiments, the stop surface is configured to engage the stop assembly responsive to about 10 feet or more of the elongated tape rule blade being in the extended position.

In some embodiments, the reel is configured such that the elongated tape rule blade has an extended portion and a wound portion. The wedge of the stop assembly is configured such that a first side of the wedge engages the wound portion of the elongated tape rule blade and a second side of the wedge engages the extended portion of the elongated tape rule blade.

In some embodiments, the retractable tape rule assembly locking system includes a first compliant member coupled to the stop assembly. The first compliant member is configured to engage the housing assembly and bias the stop assembly to the default position, wherein movement of the stop assembly by the user to the open position overcomes the bias. In some embodiments, a second compliant member is coupled to the housing assembly. The second compliant member is configured to press the extended portion of the elongated tape rule blade against the second side of the stop assembly wedge responsive to the stop assembly being in the default position.

The stop assembly locking device is coupled to the stop assembly. The stop assembly locking device is configured to be selectively engaged by the user to lock the stop assembly in the open position. The stop assembly locking device may be disposed on the stop assembly. The stop assembly locking device is configured to engage the housing assembly to lock the stop assembly in the open position. In some embodiments, the stop assembly locking device is configured to be selectively engaged by the user to lock the stop assembly in the open position responsive to the user moving the stop assembly to the open position.

In some embodiments, the retractable tape rule assembly locking system includes a second compliant member coupled to the housing assembly. The second compliant member may be configured to press the extended portion of the elongated tape rule blade against the second side of the wedge when the stop assembly is in the default position.

Another aspect of the present disclosure relates to a method for securing the retractable tape rule assembly in the default position. As described above, the retractable tape rule assembly includes the elongated tape rule blade that is configured for measurement and the reel that is configured to retract the elongated tape rule blade from the extended position to the wound position. The method comprises applying a rotational bias to the reel that rotates the reel to retract the elongated tape rule blade into the wound position; selectively engaging the elongated tape rule blade with the stop assembly to maintain the elongated tape rule blade in the extended position or the wound position, the stop assembly configured to be moveable between the default position and the open position by a user; disengaging, with the stop assembly, the elongated tape rule blade to allow retraction and extension of the elongated tape rule blade; engaging, with the stop assembly, the elongated tape rule blade to prevent retraction of the elongated tape rule blade; engaging the stop assembly with a stop surface associated with the reel to prevent rotation of the reel to retract the elongated tape rule blade, the stop surface configured to engage the stop assembly responsive to the stop assembly being in the default position and responsive to less than a pre-determined length of the elongated tape rule blade being in the wound position; and housing, with a housing assembly, the reel, the spring, and at least a portion of the elongated tape rule blade.

In some embodiments, the method includes engaging the stop assembly responsive to about 10 feet or more of the elongated tape rule blade being in the extended position. In some embodiments, the method includes engaging the stop assembly with the at least one hook of the stop surface, wherein the stop surface includes the disk with the at least one hook being formed along the circumference of the disk; and receiving the engagement by the at least one hook with the pin of the stop assembly responsive to the stop assembly being in the default position, and responsive to less than the predetermined length of the elongated tape rule blade being in the wound position. In some embodiments, the method includes engaging the wound portion of the elongated tape rule blade with a first side of the stop assembly wedge and engaging the extended portion of the elongated tape rule blade with a second side of the wedge.

In some embodiments, the method includes engaging the housing assembly with the first compliant member that is coupled to the stop assembly and biasing the stop assembly to the default position. Movement of the stop assembly by the user to the open position overcomes the bias. In some embodiments, the method includes coupling the second compliant member to the housing assembly and pressing the extended portion of the elongated tape rule blade against the second side of the wedge responsive to the stop assembly being in the default position.

In some embodiments, the method includes coupling the stop assembly locking device to the stop assembly. As described above, the stop assembly locking device may be disposed on the stop assembly. The method may include selectively engaging the stop assembly locking device to lock the stop assembly in the open position. The stop assembly locking device may engage the housing assembly to lock the stop assembly in the open position. The stop assembly locking device may be selectively engaged to lock the stop assembly in the open position responsive to the user moving the stop assembly to the open position.

In some embodiments, the method includes pressing the extended portion of the elongated tape rule blade against the stop assembly (e.g., the second side of the wedge) when the stop assembly is in the default position.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where:

FIGS. 7C and 7D illustrate two views of locking features.

FIG. 16 illustrates a method for locking a retractable tape rule assembly in a default position and/or an open position.

DETAILED DESCRIPTION OF EXEMPLARY EMBODIMENTS OF THE INVENTION

Figure 1:
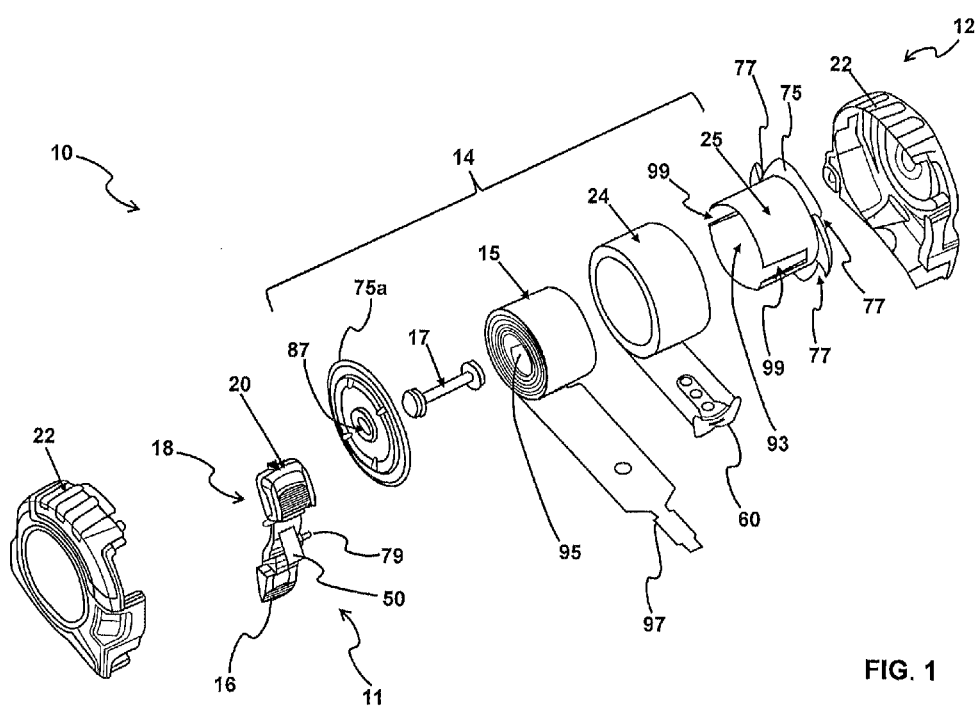
FIG. 1 illustrates components of a retractable tape rule assembly locking system for a retractable tape rule assembly.

FIG. 1 illustrates components of a retractable tape rule assembly locking system 10 for a retractable tape rule assembly 12. The retractable tape rule assembly 12 includes a reel 14, a biasing device and/or spring 15, a stop assembly 11, a stop assembly locking device 20, an elongated tape rule blade 24, a housing assembly 22, and/or other components. Reel 14 is configured to retract elongated tape rule blade 24 from an extended position to a wound position. Biasing device 15, for example in the form of a coil spring, is configured to apply a rotational bias to reel 14 that rotates reel 14 to retract elongated tape rule blade 24 into the wound position. Stop assembly 11 is configured to selectively engage elongated tape rule blade 24 to maintain elongated tape rule blade 24 in an extended position. In some implementations, stop assembly 11 includes a wedge and/or other rule engagement device 16, a lever 18, a pin 79, and/or other components. Stop assembly 11 is configured to be moveable between a default position and an open position by a user. While in the default position, stop assembly 11 engages elongated tape rule blade 24 to prevent retraction of elongated tape rule blade 24. While in the open position, stop assembly 11 disengages from elongated tape rule blade 24 to allow retraction and/or extension of elongated tape rule blade 24. Stop assembly 11 may be selectively locked in the open position by a user via a stop assembly locking device 20.

Figure 2:
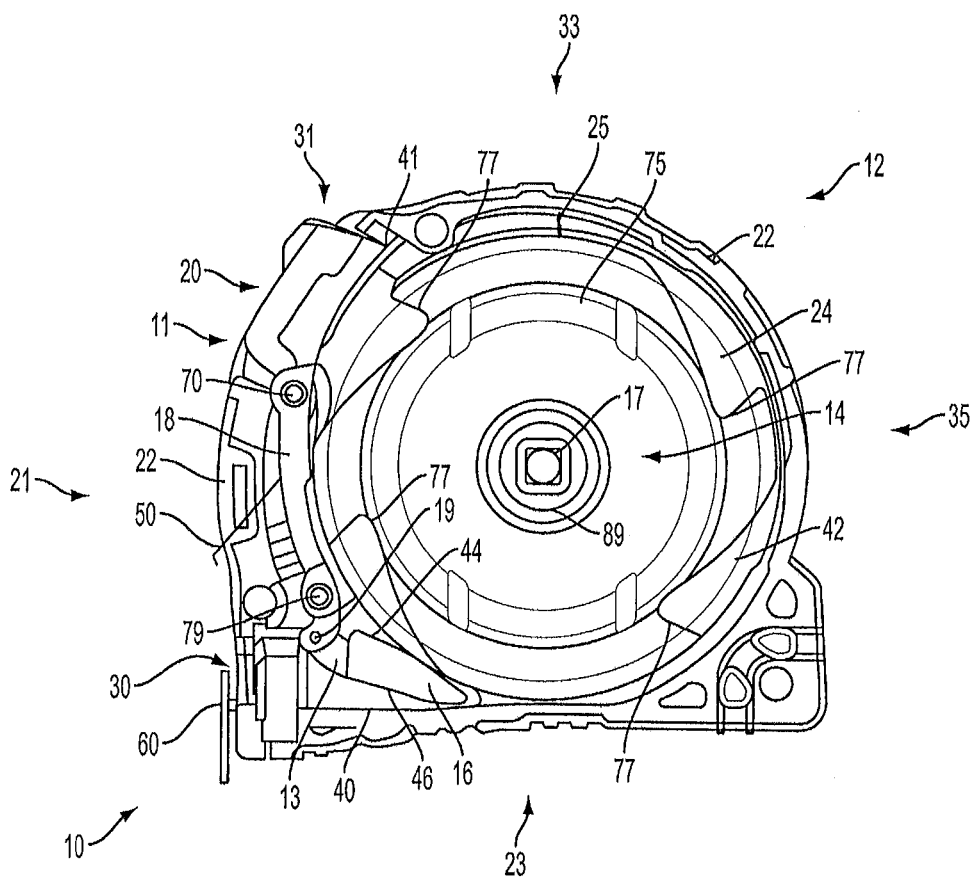
FIG. 2 illustrates a cross-section of the retractable tape rule assembly.

Reel 14 has a hub portion 25. Hub portion 25 of reel 14 has a hollow cylindrical configuration and two disk shaped side portions 75 and 75a. In some embodiments, one of the disk shaped side portions 75 is integrally formed (e.g., integrally molded) with hub portion 25, while the other disk shaped side portion 75a is connected to hub portion 25, for example, by a fastener 17 forming a spindle for reel 14. For example, fastener and/or spindle 17 may connect disk shaped side portions 75 and 75a via central openings 87, 89 (opening 89 is shown in FIG. 2) in disk shaped side portions 75 and 75a. Disk shaped side portions 75 and/or 75a have a diameter greater than the diameter of hub portion 25, such that the outer circumferences of the disk portions 75 and 75a provide opposite side walls that flank tape rule blade 24 when it is wound on hub portion 25. A hollow interior 93 of hub portion 25 receives biasing device and/or coil spring 15 therein. An internal end 95 of spring 15 is fixed relative to housing assembly 22 (e.g., via spindle 17 and/or an internal portion of housing 22 near spindle 17), while an opposite outer end 97 of biasing device and/or spring 15 extends through one of the slots 99 in hub portion 25 so as to be connected or ganged to an inner end of tape rule blade 24 and/or hub portion 25.

Biasing device and/or spring 15 is biased to rotate reel 14 relative to housing assembly 22 in a direction tending to wind up elongated tape rule blade 24 onto hub portion 25. Biasing device 15 may be configured to apply a rotational bias to reel 14 that rotates reel 14 to retract elongated tape rule blade 24 into the wound position. Biasing device 15 may be configured to retract elongated tape rule blade 24 from the extended position by rotating reel 14 with respect to housing assembly 22 in a direction to wind elongated tape rule blade 24 around reel 14. In some embodiments, elongated tape rule blade 24 may be connected to reel 14 via biasing device 15. In some embodiments, such as when biasing device 15 is a spring, the spring may be a thin, flat, ribbon of metal, such as steel and/or other materials.

In some embodiments, reel 14 is configured to engage pin 79 of stop assembly 11 such that reel 14 is prevented from retracting elongated tape rule blade 24. Reel 14 is configured to engage pin 79 responsive to stop assembly 11 being in the default position and responsive to less than a pre-determined length of elongated tape rule blade 24 being in the wound position. In some embodiments, stop assembly 11 and reel 14 are configured to prevent retraction of elongated tape rule blade 24, against the force provided by biasing device and/or spring 15, at the same time.

FIG. 2 illustrates a cross-section of retractable tape rule assembly 12. In FIG. 2, the components of FIG. 1 are shown in an assembled position. As described above, reel 14 is configured to retract elongated tape rule blade 24 from an extended position to a wound position. Reel 14 may be rotatably mounted inside housing assembly 22 via reel spindle 17 that is secured within housing assembly 22. Elongated tape rule blade 24 may be mounted on reel 14. In some embodiments, one or more components of reel 14 may be made of molded plastic and/or other materials. Elongated tape rule blade 24 may be wrapped around reel 14 and have a distal end thereof fixed relative to reel 14 for rotation with reel 14.

As described above, a distal end of elongated tape rule blade 24 may be connected to reel 14. A second end of elongated tape rule blade 24 may extend outwardly from reel 14 out of a first side 21 of retractable tape rule assembly 12. Elongated tape rule blade 24 may be configured to extend generally tangentially from reel 14 through an orifice 30 in housing assembly 22 on first side 21. In some embodiments, elongated tape rule blade 24 may be formed from a ribbon of metal and or other materials. In some embodiments, elongated tape rule blade 24 may be formed from a ribbon of sheet metal having a generally arcuate shape. For example, elongated tape rule blade 24 may be formed from steel. In some embodiments, elongated tape rule blade 24 may have a concave surface. In some embodiments, the concave surface of the blade may be printed with measuring indicia. The measuring indicia may include, for example, lines, digits, and/or other indicia for measuring lengths, distances, height, and/or other measurements. Responsive to a portion of elongated tape rule blade 24 being wound around reel 14, the wound portion may have a flattened transverse cross-section. For example, elongated tape rule blade 24 may have a flat cross-section when wound around reel 14, and when elongated tape rule blade 24 is withdrawn from housing assembly 22 to measure an object, elongated tape rule blade 24 may return to an arcuate shape. In some embodiments, a tool hook 60 may be coupled to the second end of elongated tape rule blade 24. The user may utilize tool hook 60 to removably engage elongated tape rule blade 24 with a work piece to hold elongated tape rule blade 24 in an extended position, for example.

Elongated tape rule blade 24 is generally movable by a user between a fully retracted position, wherein at least some of elongated tape rule blade 24 is coiled inside housing assembly 22, and a fully extended position, wherein at least some of elongated tape rule blade 24 extends outwardly from housing assembly 22. Reel 14 is configured such that elongated tape rule blade 24 has an extended portion 40 and a wound portion 42 within housing assembly 22. It should be appreciated that as elongated tape rule blade 24 is unwound from reel 14, biasing device 15 (e.g., the coil spring) may be wound around spindle 17, for example. This winding of biasing device and/or spring 15 around spindle 17 stores energy in biasing device and/or spring 15 to provide the necessary force for coiling elongated tape rule blade 24 around reel 14 when elongated tape rule blade 24 is released by a user from an extended position. The spring used herein as an example for biasing device 15 is not intended to be limiting. Other biasing mechanisms that provide a rotational bias to reel 14 are contemplated.

Stop assembly 11 is configured to selectively engage elongated tape rule blade 24 to maintain elongated tape rule blade 24 in an extended position. Stop assembly 11 may be located inside housing assembly 22 toward first side 21 and/or a second side 23 of retractable tape rule assembly 12 and/or in other locations. Stop assembly 11 includes a wedge and/or other rule engagement device 16, a lever 18, a pin 79, and/or other components. In some embodiments, wedge 16 may be generally wedge shaped. In some embodiments, wedge 16 may be at least partially wedge shaped. In some embodiments, wedge 16 may be and/or include one or more of a cylinder, a rectangular prism, a polyhedron, a parallelepiped, and/or components of other shapes. Wedge 16 may be configured such that a first side 44 of wedge 16 is configured to engage the wound portion 42 of elongated tape rule blade 24 and/or reel 14, and a second side 46 of wedge 16 is configured to engage the extended portion 40 of elongated tape rule blade 24. Elongated tape rule blade 24 may be held in an extended position (against the force of biasing device and/or spring 15) by force exerted on the wound portion 42 of elongated tape rule blade 24 and/or reel 14, force exerted on the extended portion 40 of elongated tape rule blade 24, and/or other forces exerted by wedge 16 and/or stop assembly 11. In some embodiments, at least a portion of second side 46 of wedge 16 may generally face second side 23. Extended portion 40 of elongated tape rule blade 24 may pass between second side 46 and second side 23.

Figure 3:
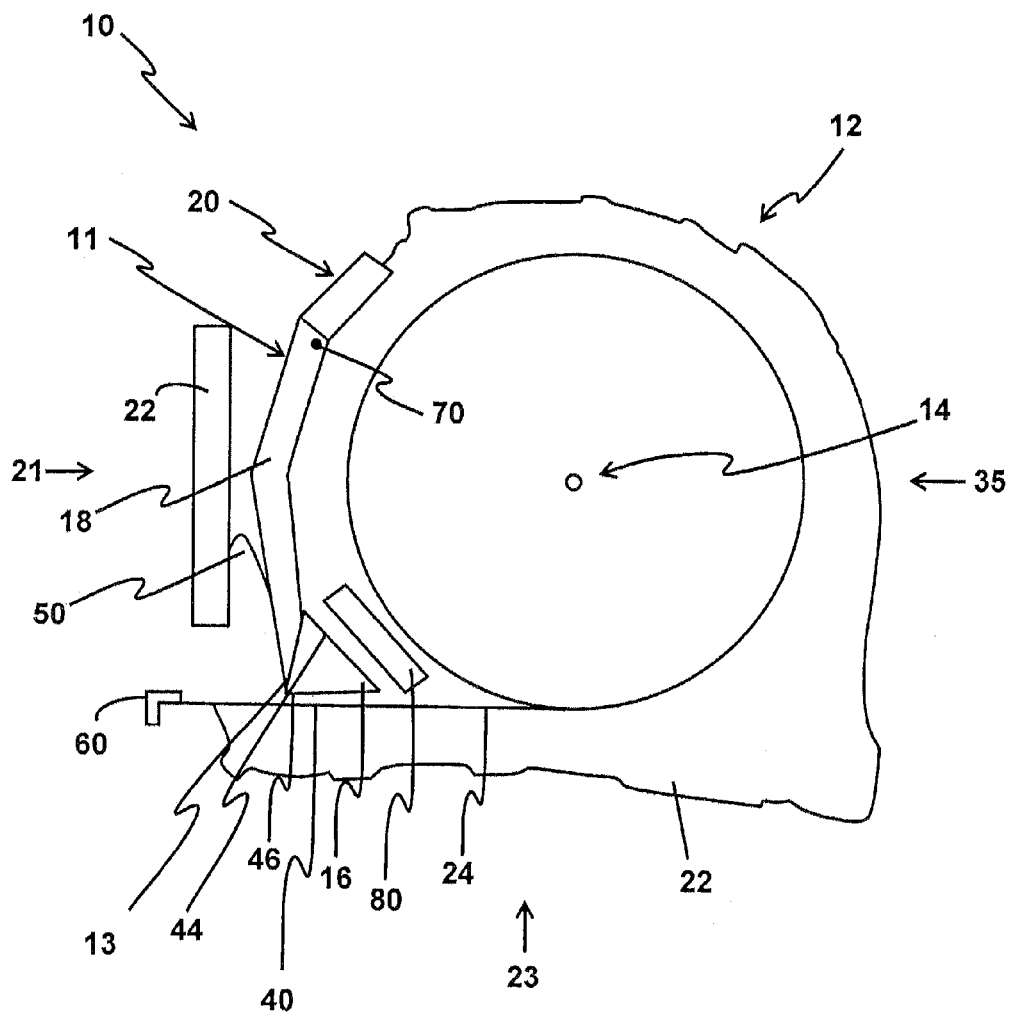
FIG. 3 illustrates a fixed stop included in a housing assembly.

FIG. 3 illustrates a fixed stop 80 included in housing assembly 22. Fixed stop 80 is configured to engage first side 44 of wedge 16 such that wedge 16 maintains elongated tape rule blade 24 in the extended position and/or the wound position responsive to first side 44 of wedge 16 engaging fixed stop 80 and second side 46 of wedge 16 engaging extended portion 40 of elongated tape rule blade 24. In some embodiments, fixed stop 80 may be located toward second side 23 between reel 14 and first side 21 such that wedge 16 engages fixed stop 80 as described above. Fixed stop 80 may be configured such that the point of engagement with wedge 16 is always in the same location and is independent of the diameter of wound portion 42 (shown in FIG. 2) of elongated tape rule blade 24. The point of engagement being independent of the diameter of wound portion 42 of elongated tape rule blade 24 minimizes the throw of stop assembly 11 because the point of engagement with wedge 16 is always in the same location.

Returning to FIG. 2, lever 18 is coupled to wedge 16. In some embodiments, lever 18 may be directly coupled to wedge 16 and/or lever 18 may be coupled to wedge 16 via one or more coupling members and/or devices. Lever 18 and wedge 16 may be coupled with each other via one or more coupling member and/or devices including, for example, beams, hinges, pins, and/or other coupling mechanisms. As illustrated in FIG. 2, a second end 13 of wedge 16 extends away from the engaged end of wedge 16 (described above) toward first side 21 of retractable tape rule assembly 12. Second end 13 is coupled with a first end 19 of lever 18. Lever 18 extends from first end 19 to a second end 31 of lever 18 toward a third side 33 of retractable tape rule assembly 12.

Lever 18 is pivotally coupled to housing assembly 22. Lever 18 may be pivotally coupled to housing assembly 22 via a pivot 70 and/or other coupling mechanisms. Lever 18 is configured to be moveable between a default position (shown in FIG. 2) and an open position by a user. Lever 18 and/or housing assembly 22 are configured such that a user engages second end 31 of lever 18 to move lever 18. In some embodiments, movement of lever 18 may include one or more of depressing second end 31 of lever 18 toward second side 23 of retractable tape rule assembly 12, rotating second end 31 of lever 18 toward a fourth side 35 of retractable tape rule assembly 12, rotating second end 31 of lever 18 toward first side 21 of retractable tape rule assembly 12, and/or other movement. Responsive to being in the default position, lever 18 causes wedge 16 to engage elongated tape rule blade 24 to prevent retraction of elongated tape rule blade 24. Engaging may include, for example, applying force to wound portion 42 and/or extended portion 40 of elongated tape rule blade 24.

Figure 4:
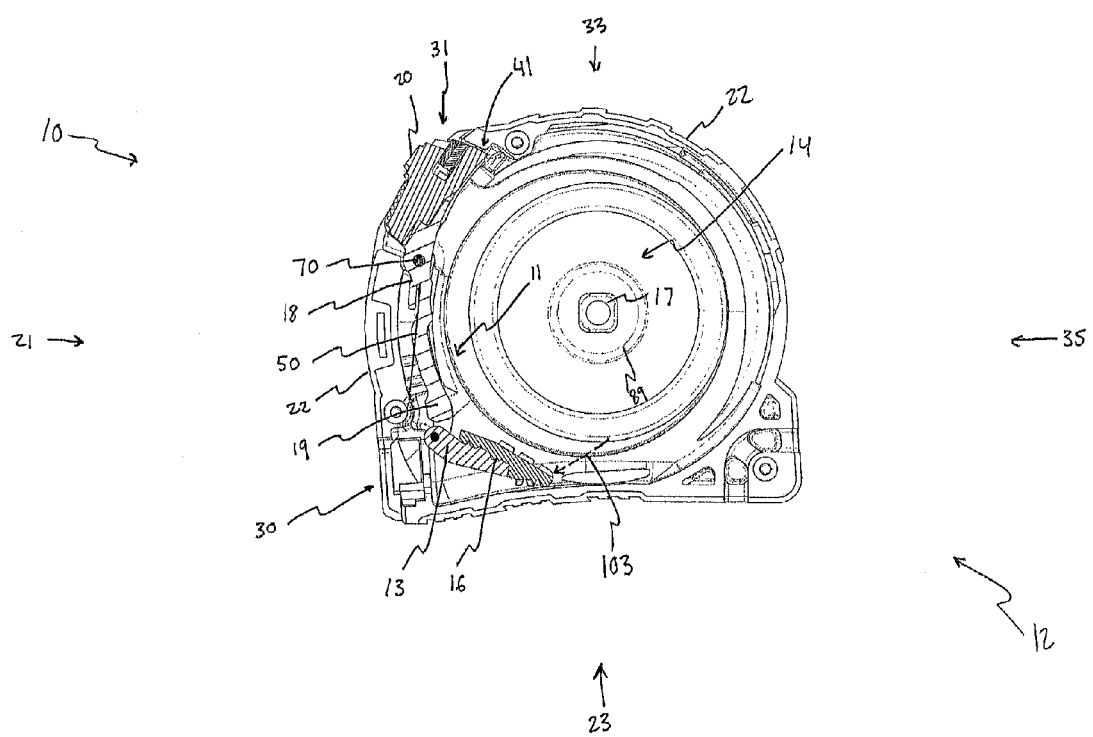
FIG. 4 illustrates a stop assembly in an open position.

For example, FIG. 4 illustrates stop assembly 11 in the open position. Stop assembly 11 may be moved to the open position by a user depressing lever 18 toward second side 23 of retractable tape rule assembly 12 and/or rotating second end 31 of lever 18 toward fourth side 35 of retractable tape rule assembly 12. Responsive to being in the in the open position, lever 18 causes wedge 16 to disengage 103 (e.g., cease applying force) from the elongated tape rule blade to allow retraction and/or extension of the elongated tape rule blade.

Returning to FIG. 2, a compliant member 50 may be coupled to lever 18. Compliant member 50 may be configured to engage housing assembly 22 and bias lever 18 to the default position. Movement of lever 18 by the user to the open position may overcome the bias. In some embodiments, compliant member 50 may have a generally arcuate shape, one or more portions that have a generally arcuate shape, and/or other shapes such that compliant member 50 bends, flexes, and/or otherwise moves responsive to a user moving lever 18 and/or releasing lever 18. Compliant member 50 may be located between lever 18 and housing assembly 22 toward first side 21 of retractable tape rule assembly 12, and/or in other locations. Compliant member 50 may be compressed between lever 18 and housing assembly 22 responsive to movement of first end 19 of lever 18 toward first side 21 of retractable tape rule assembly 12. In some embodiments, compliant member 50 is a spring. In some embodiments, compliant member 50 is a leaf spring. In some embodiments, compliant member 50 and lever 18 may form a single component.

Figure 5:
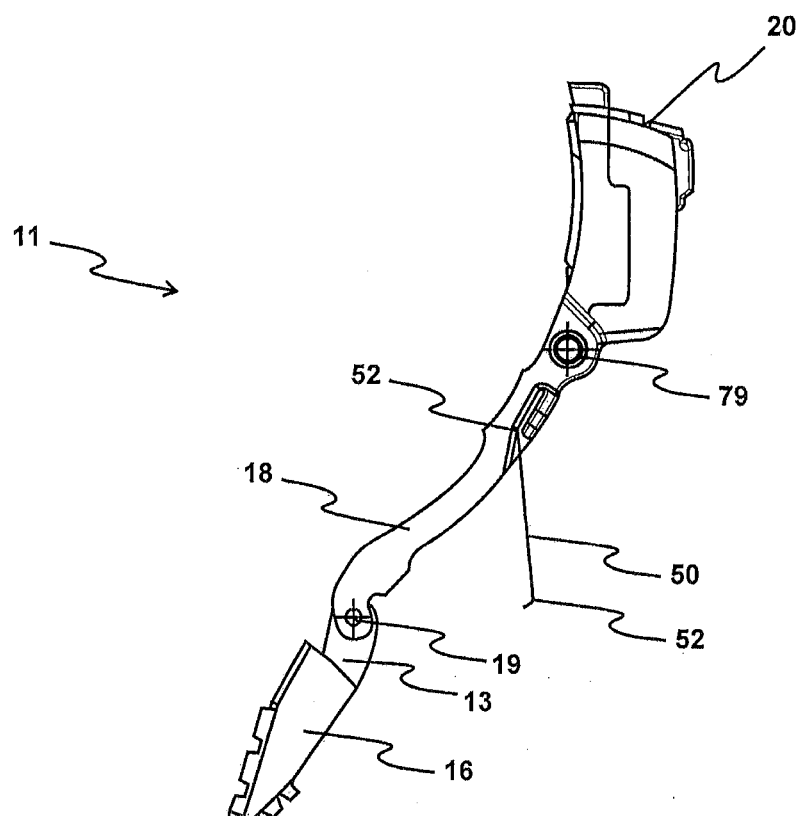
FIG. 5 illustrates the stop assembly coupled with a compliant member.

For example, FIG. 5 illustrates stop assembly 11 coupled with compliant member 50 via lever 18. FIG. 5 illustrates a side view of stop assembly 11. In some embodiments, compliant member 50 may have one or more portions 52 that are generally arcuately shaped and/or have portions with other shapes such that compliant member 50 bends, flexes, and/or otherwise moves responsive to a user moving stop assembly 11 and/or releasing stop assembly 11. Compliant member 50 may include a housing assembly engagement end 64 configured to engage a housing assembly (e.g., housing assembly 22).

Returning to FIG. 2, when taking a measurement, a user may hold housing assembly 22 in his first hand. The user may move stop assembly 11 (e.g., lever 18) to the open position and hold stop assembly 11 in the open position with his first hand while manually pulling elongated tape rule blade 24 out of housing assembly 22 with his second hand. When a sufficient length of elongated tape rule blade 24 has been withdrawn from housing assembly 22, the user may release stop assembly 11 such that compliant member 50 returns lever 18 and wedge 16 to the default position. In some embodiments, retractable tape rule assembly 12 may be configured such that the user may pull elongated tape rule blade 24 out of housing assembly 22 without first moving stop assembly 11 to the open position. With stop assembly 11 in the default position, wedge 16 holds elongated tape rule blade 24 in the extended position with respect to housing assembly 22 (against the bias of biasing device and/or spring 15). After the measurement has been taken, the user may move stop assembly 11 to the open position and hold stop assembly 11 in the open position, allowing biasing device and/or spring 15 to cause reel 14 to retract elongated tape rule blade 24 back into housing assembly 22.

Stop assembly locking device 20 is coupled to stop assembly 11. Stop assembly locking device 20 may be coupled to lever 18 of stop assembly 11. In some embodiments, stop assembly locking device 20 is disposed on lever 18. Stop assembly locking device 20 may be coupled to and/or disposed on lever 18 at and/or near second end 31 of lever 18. Stop assembly locking device 20 is configured to be selectively engaged by the user to lock stop assembly 11 in the open position. Stop assembly locking device 20 is configured to engage housing assembly 22 to lock stop assembly 11 in the open position. Stop assembly locking device 20 may be coupled to lever 18 in a sliding configuration such that the selective engagement by the user includes sliding stop assembly locking device 20 (e.g., toward third side 33 and/or fourth side 35 of retractable tape rule assembly 12) into an engaged position with housing assembly 22. In some embodiments, housing assembly 22 may include locking features 41 configured to receive stop assembly locking device 20. Locking features 41 may include slots, depressions, recesses, and/or other locking features. Stop assembly locking device 20 is configured to be selectively engaged by the user to lock stop assembly 11 in the open position responsive to the user moving stop assembly 11 to the open position against the bias of compliant member 50 (e.g., depressing lever 18 toward second side 23 and/or fourth side 35 of retractable tape rule assembly 12, and/or rotating second end 31 of lever 18 toward fourth side 35 of retractable tape rule assembly 12). In some embodiments, when engaged by the user, stop assembly locking device 20 is configured to hold stop assembly 11 in the open position indefinitely.

Stop assembly locking device 20 may be configured such that a user may slide stop assembly locking device 20 in a direction opposite the locking direction to unlock stop assembly 11 (e.g., toward first side 21 and/or second side 23 of retractable tape rule assembly 12), thus allowing the bias of compliant member 50 to return lever 18 to the default position. In some embodiments, stop assembly locking device 20 may be configured such that a user may slide stop assembly locking device 20 to unlock lever 18 after depressing lever 18 toward second side 23 of retractable tape rule assembly 12. In some embodiments, stop assembly locking device 20 may include a locking device biasing mechanism (not shown in FIG. 2) configured to bias stop assembly locking device 20 to the locked position such that a user must overcome the bias in the locking device biasing mechanism to unlock stop assembly 11.

In some embodiments, stop assembly locking device 20 is configured such that the selective engagement of stop assembly locking device 20 by the user moves stop assembly 11 from the default position to the open position and locks stop assembly 11 in the open position. This may allow a user to interact only with stop assembly locking device 20 without having to first move stop assembly 11 to the open position.

Figure 6:
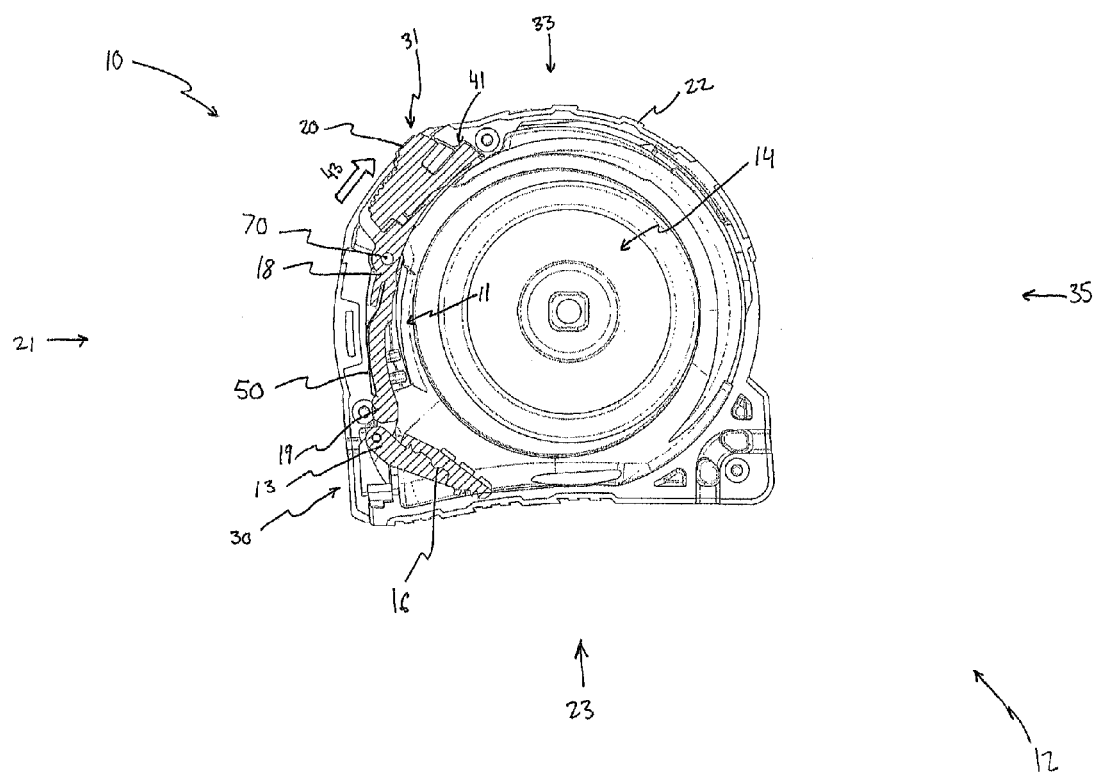
FIG. 6 illustrates the stop assembly locked in an open position by the stop assembly locking device engaged with the housing assembly.

FIG. 6 illustrates lever 18 locked in the open position by stop assembly locking device 20 engaged with locking features 41. (FIG. 6 may be compared to, for example, FIG. 4 which illustrates lever 18 in the open position but without stop assembly locking device 20 engaged with locking features 41.) A user may lock lever 18 in the open position by moving stop assembly 11 from the default position to the open position (e.g., by depressing lever 18 toward second side 23 of retractable tape rule assembly 12 and/or rotating second end 31 of lever 18 toward fourth side 35 of retractable tape rule assembly 12) and engaging stop assembly locking device 20 with housing assembly 22 (e.g., by sliding stop assembly locking device 20 toward fourth side 35 and or third side 33 of retractable tape rule assembly 12).

Responsive to the user moving stop assembly 11 to the open position, the engagement between stop assembly locking device 20 and housing assembly 22 (e.g., via locking features 41) may be effectuated by a force 43 applied to stop assembly locking device 20 by the user. Force 43 applied to stop assembly locking device 20 by the user may be, for example, along third side 33, along first side 21, and/or along a combination of third side 33 and first side 21 of retractable tape rule assembly 12. Force 43 may be directed generally toward fourth side 35 of retractable tape rule assembly 12, for example. Moving lever 18 to the open position against the bias of compliant member 50 causes stop assembly 11 (e.g., wedge 16) to disengage (e.g., cease applying force) from the elongated tape rule blade to allow retraction and/or extension of the elongated tape rule blade. Engaging stop assembly locking device 20 with locking features 41 holds lever 18 in the open position against the bias of compliant member 50. With lever 18 locked in the open position, the user may freely extend the elongated tape rule blade from housing assembly 22 and allow the elongated tape rule blade to be freely retracted back into housing assembly 22 via reel 14 and biasing device and/or spring 15 (shown in FIG. 1).

Figure 7A:
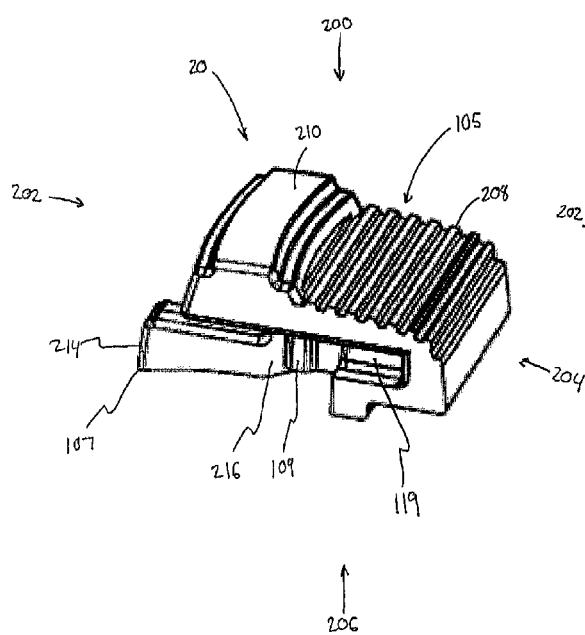
FIGS. 7A and 7B illustrate a user contact portion, a tail portion, protrusions, and/or other features of the stop assembly locking device.
Figure 7B:
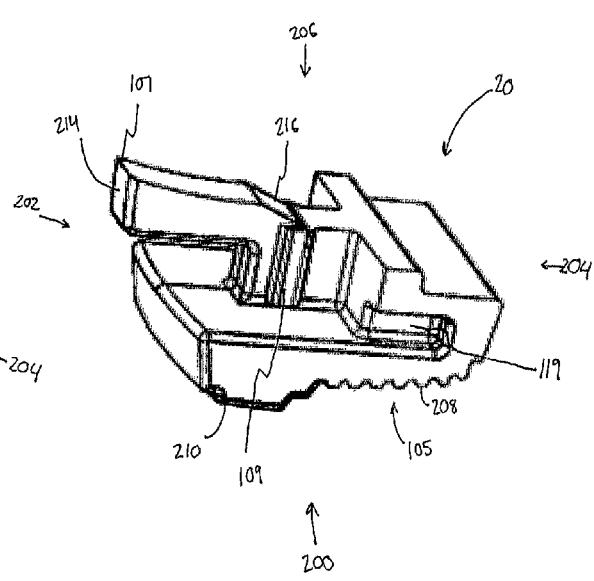

By way of a non-limiting example, FIG. 7A-7D illustrate various views of stop assembly locking device 20 and locking features 41. FIGS. 7A and 7B illustrate a user contact portion 105, a tail portion 107, protrusions 109, guide slots 119, and/or other features of stop assembly locking device 20. FIG. 7B is a rotated (relative to FIG. 7A) view of stop assembly locking device 20 that more clearly illustrates tail portion 107 and/or protrusions 109. User contact portion 105 may be located on a first side 200 of stop assembly locking device 20 and extend from a second side 202 to a third side 204. User contact portion 105 may include a raised portion 210, ridges 208, knurls, and/or other surface features configured to increase the ability of a user to grip stop assembly locking device 20. Tail portion 107 may be located on a fourth side 206 of stop assembly locking, device 20. Tail portion 107 may extend from a first end 214 at second side 202 to a second end 216 toward fourth side 204. Tail portion 107 may be located on a centerline of stop assembly locking device 20 running from second side 202 to third side 204. Protrusions 109 may be located at or near second end 216 of tail portion 107. Guide slots 119 may be located toward third side 204 relative to tail portion 107 and protrusions 109.

FIGS. 7C and 7D illustrate two views of locking features 41. FIGS. 7C and 7D illustrate a locking features body 115. Body 115 includes a tail portion receiving sleeve 111, protrusion locking fingers 113, mounting pegs 117, guides 121, and/or other components of locking features 41. FIG. 7D is a rotated (relative to FIG. 7C) view of body 115 that more clearly illustrates tail portion receiving slot 111, protrusion locking fingers 113, and/or mounting pegs 117. First side 220 of body 115 corresponds to first side 200 of stop assembly locking device 20. Second side 222 of body 115 corresponds to second side 202 of stop assembly locking device 20. Third side 224 of body 115 corresponds to third side 204 of stop assembly locking device 20. Fourth side 226 of body 115 corresponds to fourth side 206 of stop assembly locking device 20. A first end 230 of tail portion receiving slot 111 is located on second side 222 of body 115 and extends toward third side 224 to a second end 232 of tail portion receiving slot 111. Tail portion receiving slot 111 has a depth that extends from fourth side 226 toward first side 220. Tail portion receiving slot 111 is located on a centerline of body 115 running from second side 222 to third side 224. First ends 234 of protrusion locking fingers 113 are located at or near second end 232 of tail portion receiving slot 111. Protrusion locking fingers 113 extend from first ends 234 toward third side 224 to second ends 236 of protrusion locking fingers 113.

Referring to FIG. 7A-7D, contact portion 105 is configured to receive force applied by a user (e.g., force 43 shown in FIG. 6). Contact portion 105 may be the primary interface used by a user to move stop assembly 11 (shown in FIG. 6) to the open position and lock stop assembly in the open position (e.g., the user does not directly contact lever 18). The force applied by the user may be a sliding force intended to engage stop assembly locking device 20 with locking features 41. Engaging stop assembly locking device 20 with locking features 41 includes one or more of sliding guides 121 into guide slots 119, sliding tail portion 107 into tail portion receiving slot 111, engaging protrusions 109 with protrusion locking fingers 113, and/or other engagement of stop assembly locking device 20 with locking features 41. Guides 121 may be configured to engage guide slots 119 prior to sliding tail portion 107 into tail portion receiving slot 111 and/or engaging protrusions 109 with protrusion locking fingers 113. Guides 121 may be configured to engage guide slots 119 first so that tail portion 107 is substantially aligned with tail portion receiving slot 111 and/or protrusion locking fingers 113 are substantially aligned with protrusions 109 just prior to engagement. Engaging protrusions 109 with protrusion locking fingers 113 may include deflection (e.g. from a default position) by locking fingers 113 around protrusions 109 by protrusion locking fingers 113 as sliding tail portion 107 slides into tail portion reviving slot 111. Protrusion locking fingers 113 may return to the default position after deflecting around protrusions 109 to lock assembly locking device 20 with body 115. Assembly locking device 20 may be unlocked from body 115 responsive to the user forcing locking device 20 is substantially the opposite direction, for example.

In some embodiments, as in the example shown in FIG. 7C, body 115 may be a separate component that is fixedly coupled with housing assembly 22 (shown in FIG. 6). In some embodiments, body 115 may be fixedly coupled with housing assembly 22 via mounting pegs 117 and/or other components. In some embodiments, body 115 (e.g., including tail portion receiving sleeve 111 and protrusion locking fingers 113) may be integrally formed by housing assembly 22.

Figure 8:
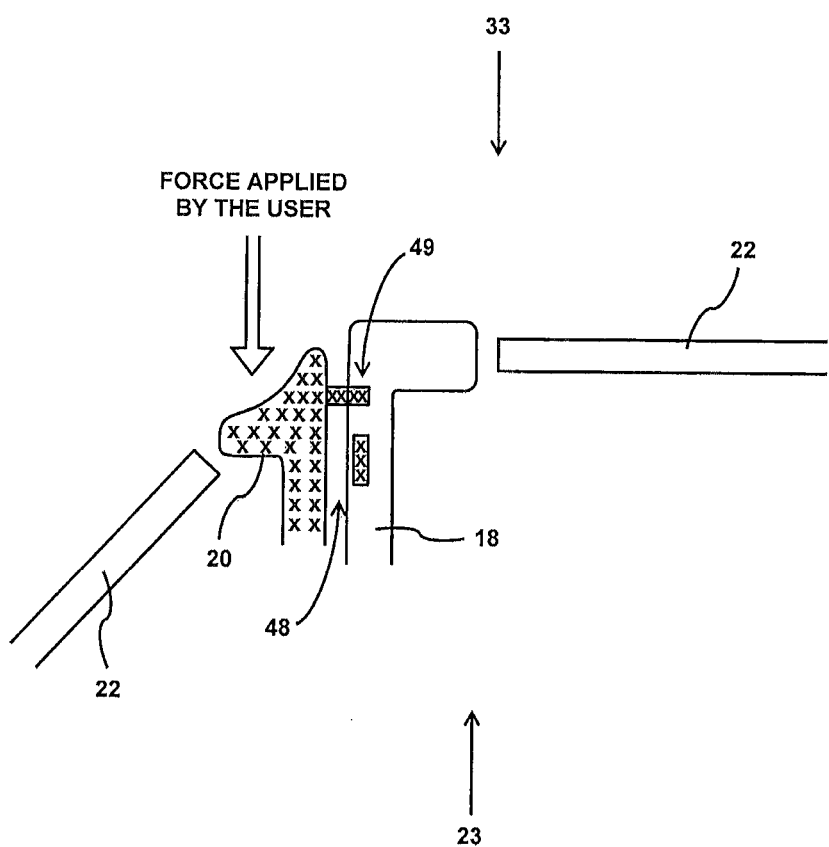
FIG. 8 illustrates a stop assembly locking device driving the stop assembly.

Other embodiments of stop assembly locking device 20 are contemplated. For example, FIG. 8 illustrates stop assembly locking device 20 driving lever 18. In the example shown in FIG. 8, the force applied by the user is toward second side 23 of retractable tape rule assembly 12. Stop assembly locking device 20 may include a proud ramp feature 48 configured to engage a proud feature 49 of lever 18 and drive lever 18 to the open position when stop assembly locking device 20 is depressed. Stop assembly locking device 20 may lock lever 18 in the open position responsive to reaching the end of the throw of stop assembly locking device 20.

Figure 9:
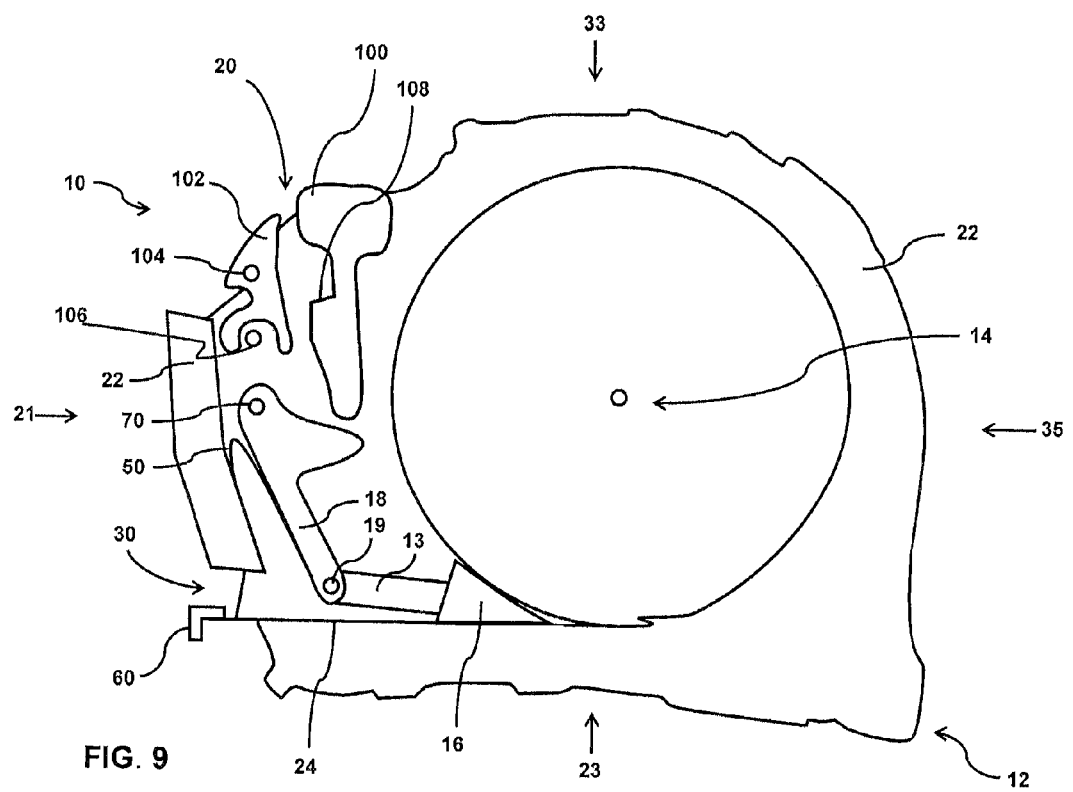
FIG. 9 illustrates another embodiment of a stop assembly locking device.

FIG. 9 illustrates another embodiment of stop assembly locking device 20. In the embodiment shown in FIG. 9, lever 18 is moved by a button 100 between the default position and the open position. FIG. 9 illustrates lever 18 in the default position. A locking device 102 is pivotally coupled with housing assembly 22 at a pivot 104. Locking device 102 is configured to be selectively engaged by the user to lock lever 18 in the open position via engagement with button 100 and housing assembly 22. Locking device 102 is configured to engage housing assembly 22 at engagement point 106 and button 100 at engagement point 108 to lock lever 18 in the open position.

Figure 10:
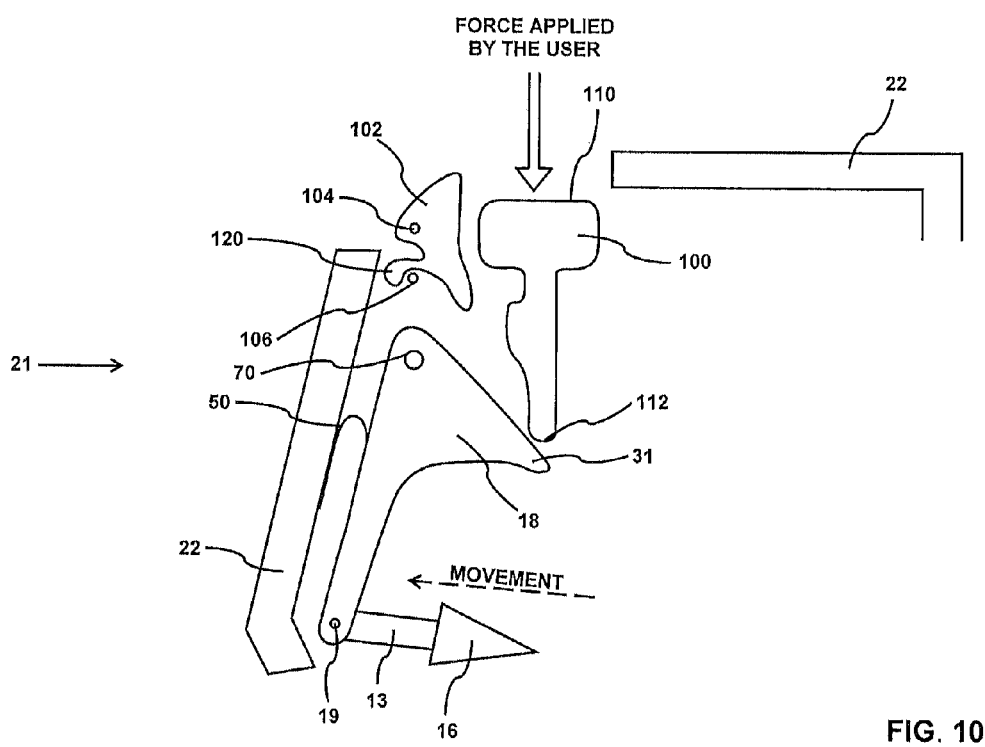
FIG. 10 illustrates another embodiment of a stop assembly in an open position.

Continuing with the embodiment of stop assembly locking device 20 shown in FIG. 9, FIG. 10 illustrates lever 18 in the open position. Responsive to being in the in the open position, lever 18 causes wedge 16 to disengage (e.g., cease applying force) from elongated tape rule blade 24 (shown in FIG. 9) to allow retraction and/or extension of elongated tape rule blade 24. In the example shown in FIG. 10, the force applied by the user is toward second side 23 of retractable tape rule assembly 12 (shown in FIG. 9). The force applied by the user causes button 100 to move toward second side 23. The force applied by the user is applied at a first end 110 of button 100. A second end 112 of button 100 engages lever 18 at second end 31 of lever 18 and causes lever 18 to move to the open position (e.g., first end 19 of lever 18 rotates toward first side 21 of retractable tape rule assembly 12).

Figure 11:
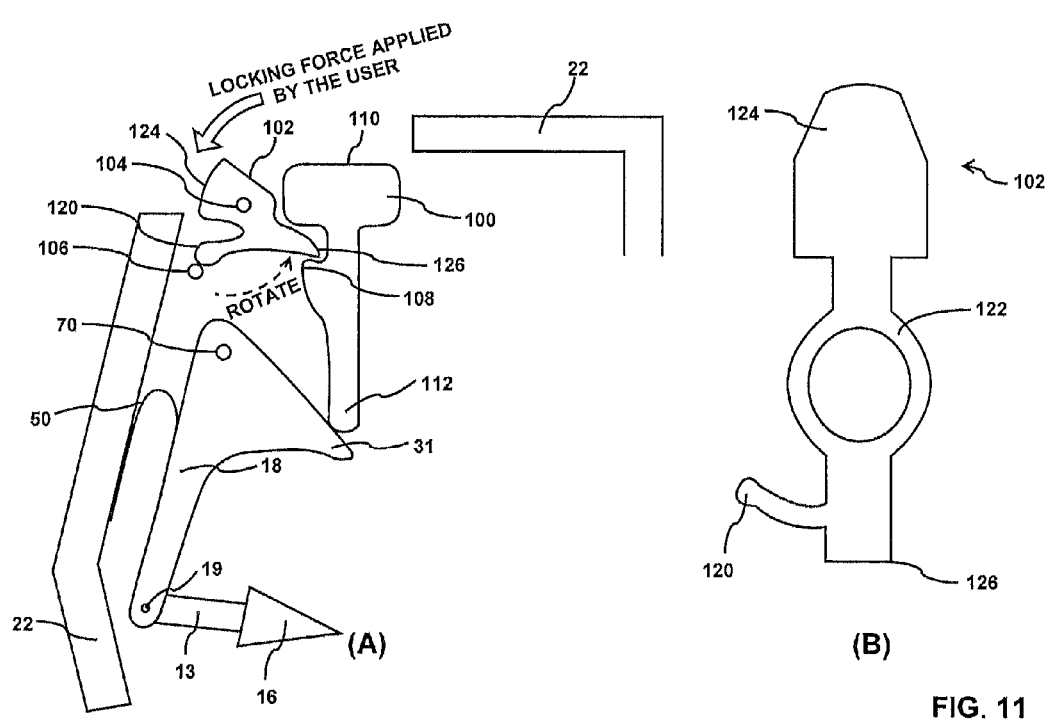
FIG. 11A illustrates a stop assembly locked in an open position by a button and a locking device.
FIG. 11B illustrates another embodiment of a locking device.

FIG. 11A illustrates lever 18 locked in the open position by button 100 and locking device 102. In FIG. 11A, locking device 102 has been selectively engaged by the user to lock lever 18 in the open position via engagement with button 100 and housing assembly 22. Engagement of locking device 102 may be responsive to the user depressing button 100 toward second side 23 (shown in FIG. 9) of retractable tape rule assembly 12. Locking device 102 has pivoted around pivot 104 toward first side 21 of retractable tape rule assembly 12 (shown in FIG. 9). Locking device 102 may be able to pivot responsive to engagement point 108 being depressed toward second side 23 beyond a button locking portion 126 of locking device 102 such that button locking portion 126 has space to rotate toward third side 33 of retractable tape rule assembly 12 (shown in FIG. 9). Engagement point 108 may lock against button locking portion 126 upon release of button 100 by the user because of the bias of compliant member 50 trying to return lever 18 to the default position and the engagement between locking device 102 and housing assembly 22 at engagement point 106.

FIG. 11B illustrates locking device 102. Locking device 102 includes a compliant spring feature 120, a sleeve 122, a finger engagement portion 124, button locking portion 126, and/or other components. Compliant spring feature 120 may be configured to resist selective engagement of locking device 102 by the user such that, responsive to the user engaging locking device 102, force is provided to button locking portion 126 to lock lever 18 in the open position (via button 100) that overcomes the bias of compliant member 50 to return lever 18 to the default position. Sleeve 122 is configured to receive pivot 104 of housing assembly 22 (not shown in FIG. 11B). Sleeve 122 is configured such that locking device 102 may rotate around pivot 104. Finger engagement portion 124 may be configured to be engaged by a finger of the user. Button locking portion 126 may be configured to engage button 100 responsive to button 100 and/or lever 18 being in the open position. Engagement between button locking portion 126 and button 100 may be configured to hold button 100 and/or lever 18 in the open position indefinitely.

Returning to FIG. 2, reel 14 is configured to engage lever 18 of stop assembly 11 to prevent rotation of reel 14 to retract elongated tape rule blade 24. Reel 14 is configured to engage lever 18 responsive to lever 18 being in the default position and responsive to less than a pre-determined length of the elongated tape rule blade being in the wound position. Reel 14 is configured to engage lever 18 responsive to lever 18 being in the default position and responsive to the wound diameter of elongated tape rule blade 24 coiled on reel 14 being less than a given size. As described above, in some embodiments, stop assembly 11 and reel 14 are configured to prevent retraction of elongated tape rule blade 24, against the force provided by biasing device 15, at the same time. For example, for a 25 foot long elongated tape rule blade 24, reel 14 may be configured to engage lever 18 responsive to about 10 feet or more of elongated tape rule blade 24 being in the extended position. The coiled portion of elongated tape rule blade 24 (about 15 feet, for example) may have a diameter less than the given size. Preventing rotation via stop assembly 11 and reel 14 at extended lengths of 10 feet or more (for example) may be advantageous because the force provided by biasing device and/or spring 15 may increase as more of elongated tape rule blade 24 is withdrawn from housing assembly 22. Stop assembly 11 alone may not be sufficient to overcome the force provided by biasing device and/or spring 15 at longer withdrawn lengths.

Figure 12:
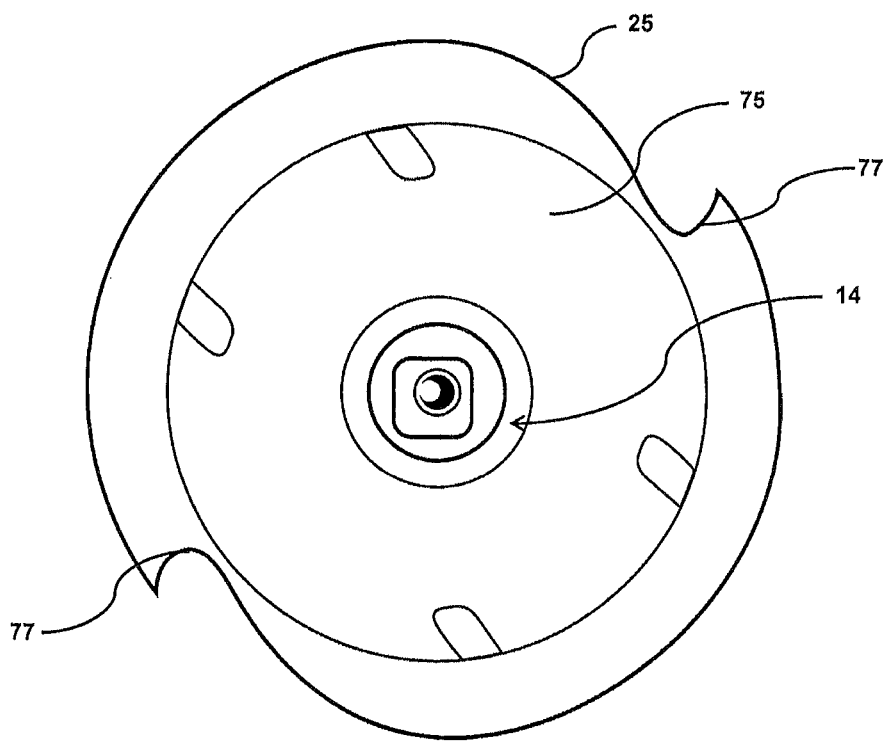
FIG. 12 illustrates a disk associated with a reel of the retractable tape rule assembly.
Figure 13:
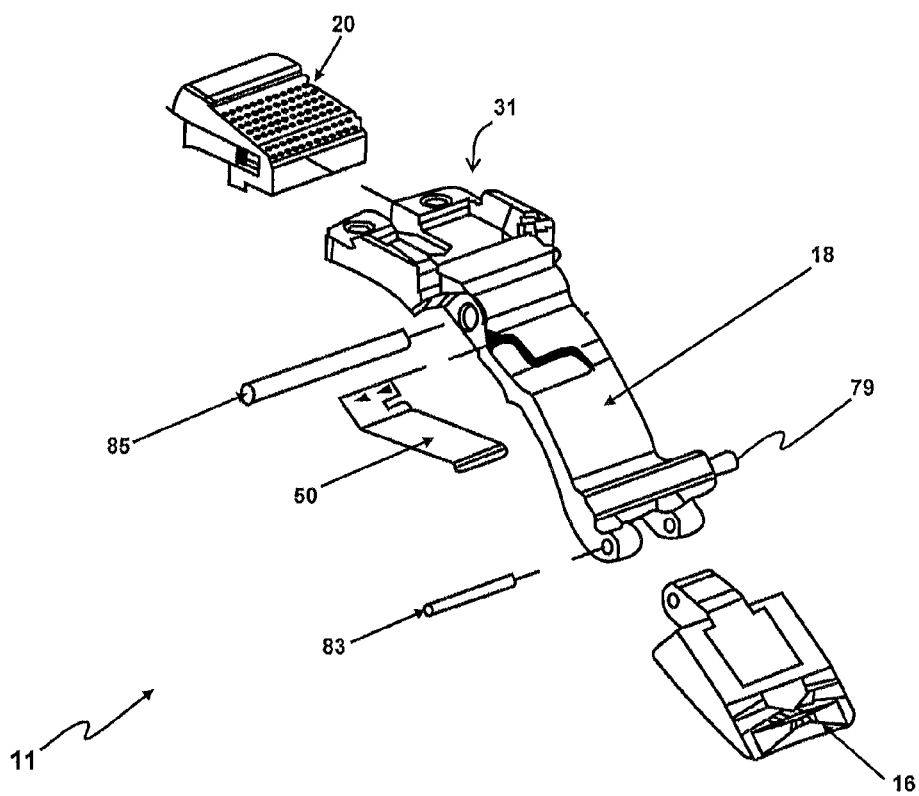
FIG. 13 illustrates a lever including an engagement pin.

In some embodiments, as noted above, reel 14 includes disk 75. In the embodiment shown in FIG. 2, disk 75 has at least one hook 77 configured to engage lever 18. The at least one hook 77 may be formed along the circumference of disk 75, and/or in other locations and/or orientations. The at least one hook 77 may have any shape that allows it to function as described herein. The at least one hook 77 may be shaped, located, and/or orientated such that the at least one hook forms a stop surface (e.g., multiple individual hooks may form multiple individual stop surfaces). The stop surface is configured to engage stop assembly 11 to prevent rotation of reel 14 to retract elongated tape rule blade 24. Stop assembly 11 (e.g., lever 18) includes pin 79 configured to receive the engagement by the at least one hook 77. Pin 79 is configured to receive the engagement responsive to stop assembly 11 (e.g., lever 18) being in the default position and responsive to less than the pre-determined length of elongated tape rule blade 24 being in the wound position. By way of a non-limiting example, FIG. 12 illustrates disk 75. Disk 75 shown in FIG. 12 has two hooks 77. This is not intended to be limiting. Disk 75 may have any number of hooks 77 that allow it to function as described herein. FIG. 13 illustrates lever 18 including pin 79. FIG. 13 includes secondary pin 83 configured to couple wedge 16 to lever 18. FIG. 13 includes a third pin 85 that may be and/or be included in pivot 70 (shown in FIG. 2).

Figure 14:
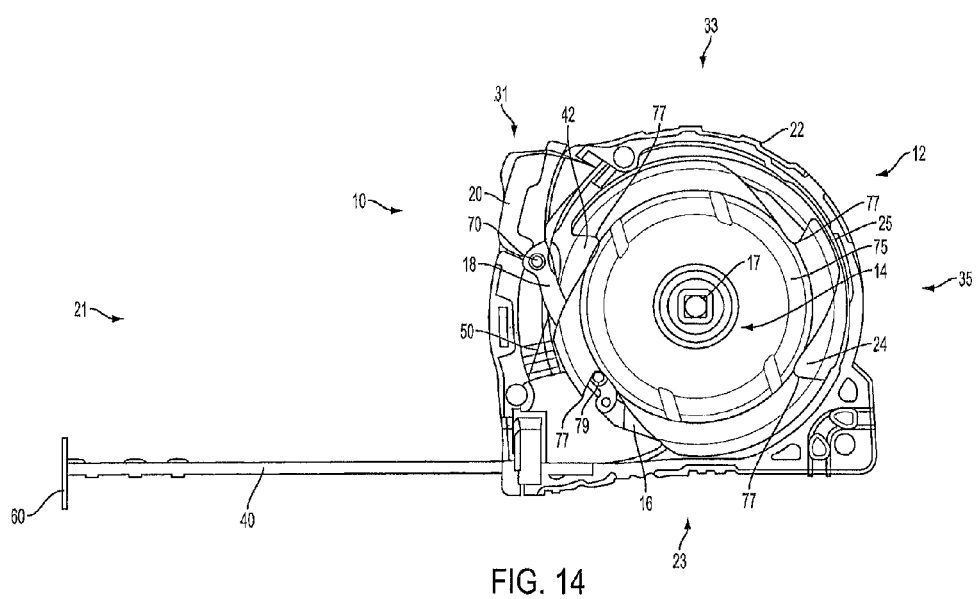
FIG. 14 illustrates a cross-section of the retractable tape rule assembly showing an elongated tape rule blade in a sufficiently extended position such that a hook of the disk engages the engagement pin of the lever.

FIG. 14 illustrates a cross-section of retractable tape rule assembly 12 showing an example of elongated tape rule blade 24 in a sufficiently extended position such that a hook 77 of disk 75 engages pin 79 of stop assembly 11. As described above, stop assembly 11 (e.g., wedge 16) alone may not be sufficient to overcome the force provided by biasing device 15 at longer withdrawn lengths. Hook 77 may engage pin 79 responsive to the force provided by biasing device 15 overcoming the resistance provided by wedge 16. As reel 14 begins to retract elongated tape rule blade 24, disk 75 may rotate such that hook 77 engages pin 79. Hook 77 may engage pin 79 responsive to lever 18 being in the default position and responsive to the diameter of wound portion 42 of elongated tape rule blade 24 being less than a given diameter (e.g., the given diameter may be the diameter of about 15 feet or less of elongated tape rule blade 24 coiled on reel 14). With lever 18 in the default position, as more and more of elongated tape rule blade 24 is unwound, compliant member 50 pushes lever 18 and pin 79 toward wound portion 42, closer and closer to fourth side 35 and/or third side 33 of retractable tape rule assembly 12. When the diameter of wound portion 42 is larger than the given diameter, hooks 77 will not engage pin 79 because lever 18 has not been pushed by compliant member 50 far enough toward fourth side 35 and/or third side 33 of retractable tape rule assembly 12. When the diameter of wound portion 42 is smaller than the given diameter, hooks 77 will engage pin 79 because lever 18 has been pushed by compliant member 50 far enough toward fourth side 35 of retractable tape rule assembly 12.

Figure 15:
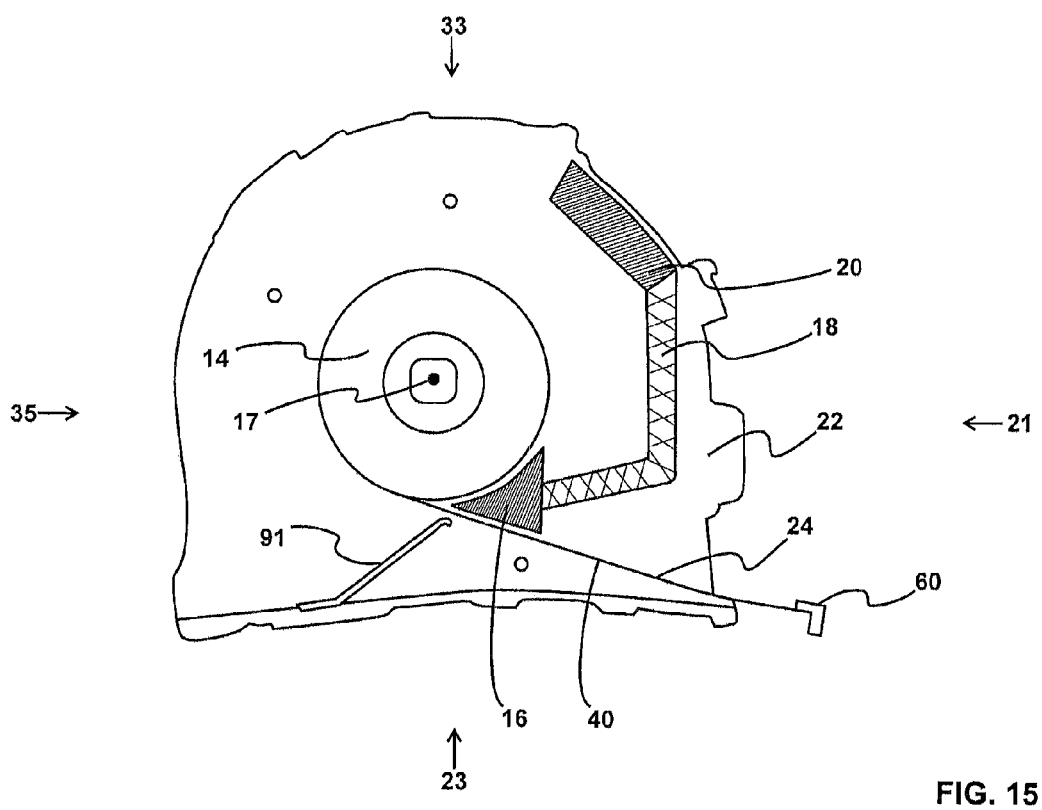
FIG. 15 illustrates a compliant member coupled to the housing assembly.

FIG. 15 illustrates a second compliant member 91 coupled to housing assembly 22. Second compliant member 91 is configured to press extended portion 40 of elongated tape rule blade 24 against wedge 16 of stop assembly 11. Second compliant member 91 is configured to press extended portion 40 against wedge 16 responsive to stop assembly 11 (e.g., lever 18) being in the default position. In some embodiments, pressing extended portion 40 against wedge 16 may prevent extended portion 40 of elongated tape rule blade 24 from bending around stop assembly 11, moving around stop assembly 11, and/or otherwise being in a position that would cause retractable tape rule assembly 12 to not function as described herein.

Returning to FIG. 2, housing assembly 22 is configured to house one or more components of retractable tape rule assembly 12. For example, housing assembly 22 may house one or more of reel 14, biasing device and/or spring 15, at least a portion of elongated tape rule blade 24, stop assembly 11, stop assembly locking device 20, compliant member 50, compliant member 91, and/or other components of retractable tape rule assembly 12. In some embodiments housing the components of retractable tape rule assembly 12 may include carrying one or more of the components inside housing assembly 22 and/or outside housing assembly 22. In some embodiments, housing the components may include physically supporting one or more of the components of retractable tape rule assembly 12 without physically surrounding the housed components. In some embodiments, for example, housing 22 may include only a frame (e.g., no walls of the housing enclosing an interior of the frame) configured to support the components of retractable tape rule assembly 12. In some embodiments, housing 22 may include one or more orifices of various sizes and shapes formed in housing 22 configured to allow a user to view the components of retractable tape rule assembly 12 housed by housing 22.

Housing assembly 22 is configured to house the components of retractable tape rule assembly locking system 10 and/or retractable tape rule assembly 12 such that retractable tape rule assembly 12 is handheld and portable. In some embodiments, a handle may be formed in and/or formed by housing assembly 22. The handle may be configured to be grasped by a user to hold housing assembly 22 in during use. The handle may be formed in housing assembly 22 by way of a ridged, knurled, and/or other textured surfaces. The handle formed in housing assembly 22 may comprise finger shaped surface depressions in housing assembly 22 such that a user's fingers may fit into the finger depressions for gripping retractable tape rule assembly 12. The form factor for the handle formed by housing assembly 22 described in the present disclosure is not intended to be limiting. The handle may be attached to and/or formed in housing assembly 22 by any method, in any shape, and/or in any location(s) that allows it to function as described herein. In some embodiments, housing assembly 22 may not include a handle.

FIG. 16 illustrates method 1000 for securing a retractable tape rule assembly in a default position and/or an open position. The retractable tape rule assembly includes an elongated tape rule blade configured for measurement and a reel configured to retract the elongated tape rule blade from an extended position to a wound position. The operations of method 1000 presented below are intended to be illustrative. In some embodiments, method 1000 may be accomplished with one or more additional operations not described, and/or without one or more of the operations discussed. Additionally, the order in which the operations of method 1000 are illustrated in FIG. 16 and described below is not intended to be limiting.

At an operation 1002, a rotational bias may be applied to the reel that rotates the reel to retract the elongated tape rule blade into the wound position. The elongated tape rule blade may have an extended portion and a wound portion. Operation 1002 may be performed by a biasing device and/or spring that is the same as or similar to biasing device and/or spring 15 (shown in FIG. 1 and described herein).

At an operation 1004, the elongated tape rule blade may be selectively engaged. The elongated tape rule blade may be selectively engaged with a stop assembly. In some embodiments, the stop assembly includes a lever, a wedge, a pin, and/or other components. The elongated tape rule blade may be selectively engaged to maintain the elongated tape rule blade in the extended position. Selectively engaging the elongated tape rule blade may include engaging the wound portion of the elongated tape rule blade with a first side of the wedge and engaging the extended portion of the elongated tape rule blade with a second side of the wedge. The lever may be configured to be moveable between a default position and an open position by a user. A first compliant member coupled to the lever may engage a housing assembly housing the components of the retractable tape rule assembly. The first compliant member is configured to bias the lever to the default position, wherein movement of the lever by the user to the open position overcomes the bias. Operation 1004 may be performed by a stop assembly that is the same as or similar to stop assembly 11 (shown in FIG. 1 and described herein).

At an operation 1006, responsive to the stop assembly being in the open position, the stop assembly may disengage from the elongated tape rule blade to allow retraction and/or extension of the elongated tape rule blade. In some embodiments, selectively engaging the stop assembly locking device to lock the stop assembly in the open position may be responsive to the user moving the stop assembly to the open position. Operation 1006 may be performed by a stop assembly that is the same as or similar to stop assembly 11 (shown in FIG. 1 and described herein).

At an operation 1008, a stop assembly locking device may be coupled with the stop assembly. The stop assembly locking device may be disposed on the stop assembly. The stop assembly locking device may be disposed on the lever of the stop assembly. Operation 1008 may be performed by a stop assembly locking device that is the same as or similar to stop assembly locking device 20 (shown in FIG. 1 and described herein).

At an operation 1010 the stop assembly locking device may be selectively engaged to lock the stop assembly in the open position. The stop assembly locking device may be configured to engage the housing assembly to lock the stop assembly in the open position. Operation 1010 may be performed by a stop assembly locking device and/or locking features that are the same as or similar to stop assembly locking device 20 and/or locking features 41 (shown in FIG. 1 shown in FIGS. 7A-7D, and described herein).

At an operation 1012, the stop assembly locking device may be disengaged and the stop assembly may engage the elongated tape rule blade. Responsive to the stop assembly being in the default position, the stop assembly may engage the elongated tape rule blade to prevent retraction of the elongated tape rule blade from an extended position. The stop assembly may engage the elongated tape rule blade via the wedge of the stop assembly, for example. Operation 1012 may be performed by a stop assembly that is the same as or similar to stop assembly 11 (shown in FIG. 1 and described herein).

At an operation 1014, the stop assembly may be engaged with a stop surface associated with the reel. The stop surface is configured to engage the stop assembly to prevent rotation of the reel to retract the elongated tape rule blade. The stop surface is configured to engage the stop assembly responsive to the stop assembly being in the default position and responsive to less than a pre-determined length of the elongated tape rule blade being in the wound position. In some embodiments, the stop surface may engage the stop assembly responsive to about 10 feet or more of the elongated tape rule blade being in the extended position. In some embodiments, the stop surface includes a disk with at least one hook being formed along the circumference of the disk. The stop surface may engage the stop assembly with via the at least one hook of the stop surface. The stop assembly may receive the engagement by the at least one hook with the pin of the stop surface. Operation 1014 may be performed by a reel that is the same as or similar to reel 14 (shown in FIG. 1 and described herein).

At an operation 1016, the reel, the biasing device and/or spring, at least a portion of the elongated tape rule blade, and/or other components may be housed with the housing assembly. Operation 1016 may be performed by a housing assembly that is the same as or similar to housing assembly 22 (shown in FIG. 1 and described herein).

At an operation 1018, an extended portion of the elongated tape rule blade is pressed against the stop assembly responsive to the stop assembly being in the default position. In some embodiments, a second compliant member may be coupled with the housing assembly. The second compliant member is configured to press an extended portion of the elongated tape rule blade against the wedge of the stop assembly responsive to the stop assembly being in the default position. Operation 1018 may be performed by a compliant member that is the same as or similar to compliant member 91 (shown in FIG. 15 and described herein).

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A retractable tape rule assembly locking system, the system comprising:
   an elongated tape rule blade configured for measurement, the elongated tape rule blade including measurement indicia;
   a reel configured to retract the elongated tape rule blade from an extended position to a wound position;
   a spring configured to apply a rotational bias to the reel that rotates the reel to retract the elongated tape rule blade into the wound position;
   a stop assembly configured to selectively engage the elongated tape rule blade to maintain the elongated tape rule blade in the extended position or the wound position, the stop assembly configured to be moveable between a default position and an open position by a user,
      wherein, while the stop assembly is in the default position, the stop assembly engages the elongated tape rule blade to prevent retraction of the elongated tape rule blade, and
      wherein, while the stop assembly is in the open position, the stop assembly is disengaged from the elongated tape rule blade to allow retraction and extension of the elongated tape rule blade;
   a stop surface associated with the reel and configured to engage the stop assembly to prevent rotation of the reel to retract the elongated tape rule blade, the stop surface configured to engage the stop assembly responsive to the stop assembly being in the default position and responsive to less than a pre-determined length of the elongated tape rule blade being in the wound position; and
   a housing assembly configured to house one or more of the reel, the spring, or at least a portion of the elongated tape rule blade.

2. The system of claim 1, wherein the stop assembly includes a lever.

3. The system of claim 1, wherein the stop surface is configured to engage the stop assembly responsive to about 10 feet or more of the elongated tape rule blade being in the extended position.

4. The system of claim 1, wherein the stop surface is formed by a disk having at least one hook configured to engage the stop assembly, the at least one hook being formed along the circumference of the disk.

5. The system of claim 4, wherein the stop assembly includes a pin configured to receive the engagement by the at least one hook responsive to the stop assembly being in the default position and responsive to less than the pre-determined length of the elongated tape rule blade being in the wound position.

6. The system of claim 1, further comprising a first compliant member coupled to the stop assembly, the first compliant member configured to engage the housing assembly and bias the stop assembly to the default position, wherein movement of the stop assembly by the user to the open position overcomes the bias.

7. The system of claim 1, wherein the stop assembly includes a wedge.

8. The system of claim 7, wherein the reel is configured such that the elongated tape rule blade has an extended portion and a wound portion, and wherein the wedge is configured such that a first side of the wedge engages the wound portion of the elongated tape rule blade and a second side of the wedge engages the extended portion of the elongated tape rule blade.

9. The system of claim 8, further comprising a second compliant member coupled to the housing assembly, the second compliant member configured to press the extended portion of the elongated tape rule blade against the second side of the wedge when the stop assembly is in the default position.

10. The system of claim 1, further comprising a stop assembly locking device coupled to the stop assembly, the stop assembly locking device configured to be selectively engaged by the user to lock the stop assembly in the open position, the stop assembly locking device being configured to engage the housing assembly to lock the stop assembly in the open position.

11. The system of claim 10, wherein the stop assembly locking device is configured to be selectively engaged by the user to lock the stop assembly in the open position responsive to the user moving the stop assembly to the open position.

12. A method for securing a retractable tape rule assembly in a default position, the retractable tape rule assembly including an elongated tape rule blade configured for measurement and a reel configured to retract the elongated tape rule blade from an extended position to a wound position, the method comprising:
applying a rotational bias to the reel that rotates the reel to retract the elongated tape rule blade into the wound position;
selectively engaging the elongated tape rule blade with a stop assembly to maintain the elongated tape rule blade in the extended position or the wound position, the stop assembly configured to be moveable between a default position and an open position by a user;
disengaging, with the stop assembly, the elongated tape rule blade to allow retraction and extension of the elongated tape rule blade;
coupling a stop assembly locking device to the stop assembly;
selectively engaging the stop assembly locking device to lock the stop assembly in the open position, the stop assembly locking device configured to engage a housing assembly to lock the stop assembly in the open position;
disengaging the stop assembly locking device from the housing and engaging the elongated tape rule blade with the stop assembly to prevent retraction of the elongated tape rule blade;
engaging the stop assembly with a stop surface associated with the reel to prevent rotation of the reel to retract the elongated tape rule blade, the stop surface configured to engage the stop assembly responsive to the stop assembly being in the default position and responsive to less than a pre-determined length of the elongated tape rule blade being in the wound position;
housing, with the housing assembly, one or more of the reel, the spring, or at least a portion of the elongated tape rule blade; and
pressing an extended portion of the elongated tape rule blade against the stop assembly when the stop assembly is in the default position.

13. The method of claim 12, wherein the stop assembly includes a lever.

14. The method of claim 12, further comprising engaging the stop assembly with the stop surface responsive to about 10 feet or more of the elongated tape rule blade being in the extended position.

15. The method of claim 12, further comprising forming the stop surface in a disk having at least one hook configured to engage the stop assembly, the at least one hook being formed along the circumference of the disk.

16. The method of claim 15, further comprising receiving the engagement by the at least one hook with a pin of the stop assembly responsive to the stop assembly being in the default position and responsive to less than the pre-determined length of the elongated tape rule blade being in the wound position.

17. The method of claim 12, further comprising engaging the housing assembly with a first compliant member coupled to the stop assembly, the first compliant member configured to engage the housing assembly and bias the stop assembly to the default position, wherein movement of the stop assembly by the user to the open position overcomes the bias.

18. The method of claim 17, wherein the stop assembly includes a wedge.

19. The method of claim 18, wherein the elongated tape rule blade includes the extended portion and a wound portion, the method further comprising engaging the wound portion of the elongated tape rule blade with a first side of the wedge and engaging the extended portion of the elongated tape rule blade with a second side of the wedge such that the tie extended portion of the elongated tape rule blade is pressed against the second side of the wedge.

20. The method of claim 12, further comprising selectively engaging the stop assembly in the open position responsive to the user moving the stop assembly to the open position.

21. A retractable tape rule assembly locking system, the system comprising:
an elongated tape rule blade configured for measurement, the elongated tape rule blade including measurement indicia;
a reel configured to retract the elongated tape rule blade from an extended position to a wound position;
a spring configured to apply a rotational bias to the reel that rotates the reel to retract the elongated tape rule blade into the wound position;
a stop assembly configured to selectively engage the elongated tape rule blade to maintain the elongated tape rule blade in the extended position or the wound position, the stop assembly comprising surface portions configured to selectively engage both a wound portion and an extended portion of the elongated tape rule blade simultaneously at a region where the extended portion meets the wound portion, the stop assembly configured to be moveable between a default position and an open position by a user, wherein, while the stop assembly is in the default position, the surface portions of the stop assembly engages the wound portion and the extended portion of the elongated tape rule blade to prevent retraction of the elongated tape rule blade, and wherein, while the stop assembly is in the open position, the surface portions of the stop assembly are disengaged from the wound portion and the extended portion of the elongated tape rule blade to allow retraction and extension of the elongated tape rule blade;

a stop assembly locking device coupled to the stop assembly, the stop assembly locking device configured to be selectively engaged by the user to lock the stop assembly in the open position; and a housing assembly configured to house one or more of the reel, the spring, or at least a portion of the elongated tape rule blade, wherein the stop assembly locking device is configured to engage the housing assembly to lock the stop assembly in the open position.

22. The system of claim 21, wherein the stop assembly comprises a wedge, and wherein the surface portions of the stop assembly are formed on the wedge.

23. The system of claim 22, wherein the stop assembly is articulated to facilitate the selective engagement by the wedge with the wound portion and the extended portion of the elongated tape rule blade.

24. A retractable tape rule assembly locking system, the system comprising:

an elongated tape rule blade configured for measurement, the elongated tape rule blade including measurement indicia;

a reel configured to retract the elongated tape rule blade from an extended position to a wound position;

a spring configured to apply a rotational bias to the reel that rotates the reel to retract the elongated tape rule blade into the wound position;

a stop assembly configured to selectively engage the elongated tape rule blade to maintain the elongated tape rule blade in the extended position or the wound position, the stop assembly configured to be moveable between a default position and an open position by a user, wherein, while the stop assembly is in the default position, the stop assembly engages the elongated tape rule blade to prevent retraction of the elongated tape rule blade, and wherein, while the stop assembly is in the open position, the stop assembly is disengaged from the elongated tape rule blade to allow retraction and extension of the elongated tape rule blade;

a stop assembly locking device coupled to the stop assembly, the stop assembly locking device configured to be selectively engaged by the user to lock the stop assembly in the open position;

a housing assembly configured to house one or more of the reel, the spring, or at least a portion of the elongated tape rule blade, wherein the stop assembly locking device is configured to engage the housing assembly to lock the stop assembly in the open position; and a stop surface associated with the reel and configured to engage the stop assembly to prevent rotation of the reel to retract the elongated tape rule blade, the stop surface configured to engage the stop assembly responsive to the stop assembly being in the default position and responsive to less than a pre-determined length of the elongated tape rule blade being in the wound position.

25. The system of claim 24, wherein the stop assembly locking device is configured to be selectively engaged by the user to lock the stop assembly in the open position responsive to the user moving the stop assembly to the open position.

26. The system of claim 24, wherein the stop surface is formed by a disk having at least one hook configured to engage the stop assembly, the at least one hook being formed along the circumference of the disk.

27. The system of claim 26, wherein the stop assembly includes a pin configured to receive the engagement by the at least one hook responsive to the stop assembly being in the default position and responsive to less than the pre-determined length of the elongated tape rule blade being in the wound position.

28. The system of claim 24, further comprising a first compliant member coupled to the stop assembly, the first compliant member configured to engage the housing assembly and bias the stop assembly to the default position, wherein movement of the stop assembly by the user to the open position overcomes the bias.

29. The system of claim 24, further comprising a second compliant member coupled to the housing assembly, the second compliant member configured to press an extended portion of the elongated tape rule blade against the stop assembly when the stop assembly is in the default position.

30. A retractable tape rule assembly locking system, the system comprising:

an elongated tape rule blade configured for measurement, the elongated tape rule blade including measurement indicia;

a reel configured to retract the elongated tape rule blade from an extended position to a wound position;

a spring configured to apply a rotational bias to the reel that rotates the reel to retract the elongated tape rule blade into the wound position;

a stop assembly configured to selectively engage the elongated tape rule blade to maintain the elongated tape rule blade in the extended position or the wound position, the stop assembly comprising surface portions configured to selectively engage both a wound portion and an extended portion of the elongated tape rule blade simultaneously at a region where the extended portion meets the wound portion, the stop assembly configured to be moveable between a default position and an open position by a user, wherein, while the stop assembly is in the default position, the surface portions of the stop assembly engages the wound portion and the extended portion of the elongated tape rule blade to prevent retraction of the elongated tape rule blade, and wherein, while the stop assembly is in the open position, the surface portions of the stop assembly is are disengaged from the wound portion and the extended portion of the elongated tape rule blade to allow retraction and extension of the elongated tape rule blade;

a housing assembly configured to house one or more of the reel, the spring, or at least a portion of the elongated tape rule blade;

a first compliant member coupled to the stop assembly, the first compliant member configured to engage the housing assembly and bias the stop assembly to the default position, wherein movement of the stop assembly by the user to the open position overcomes the bias to the default position; and a second compliant member coupled to the housing assembly, the second compliant member configured to press an extended portion of the elongated tape rule blade against the stop assembly when the stop assembly is in the default position.

31. The system of claim 30, wherein the stop assembly comprises a wedge, and wherein the surface portions of the stop assembly are formed on the wedge.

32. The system of claim 31, wherein the stop assembly is articulated to facilitate the selective engagement by the wedge with the wound portion and the extended portion of the elongated tape rule blade.

33. A retractable tape rule assembly locking system, the system comprising:
- an elongated tape rule blade configured for measurement, the elongated tape rule blade including measurement indicia;
- a reel configured to retract the elongated tape rule blade from an extended position to a wound position;
- a spring configured to apply a rotational bias to the reel that rotates the reel to retract the elongated tape rule blade into the wound position;
- a stop assembly configured to selectively engage the elongated tape rule blade to maintain the elongated tape rule blade in the extended position or the wound position, the stop assembly configured to be moveable between a default position and an open position by a user,
  - wherein, while the stop assembly is in the default position, the stop assembly engages the elongated tape rule blade to prevent retraction of the elongated tape rule blade, and
  - wherein, while the stop assembly is in the open position, the stop assembly is disengaged from the elongated tape rule blade to allow retraction and extension of the elongated tape rule blade;
- a housing assembly configured to house one or more of the reel, the spring, or at least a portion of the elongated tape rule blade;
- a first compliant member coupled to the stop assembly, the first compliant member configured to engage the housing assembly and bias the stop assembly to the default position, wherein movement of the stop assembly by the user to the open position overcomes the bias to the default position; and
- a second compliant member coupled to the housing assembly, the second compliant member configured to press an extended portion of the elongated tape rule blade against the stop assembly when the stop assembly is in the default position; and
- a stop surface associated with the reel and configured to engage the stop assembly to prevent rotation of the reel to retract the elongated tape rule blade, the stop surface configured to engage the stop assembly responsive to the stop assembly being in the default position and responsive to less than a pre-determined length of the elongated tape rule blade being in the wound position.

34. The system of claim 33, wherein the stop surface is formed by a disk having at least one hook configured to engage the stop assembly, the at least one hook being formed along the circumference of the disk.

35. The system of claim 34, wherein the stop assembly includes a pin configured to receive the engagement by the at least one hook responsive to the stop assembly being in the default position and responsive to less than the pre-determined length of the elongated tape rule blade being in the wound position.

36. The system of claim 33, further comprising a stop assembly locking device coupled to the stop assembly, the stop assembly locking device configured to be selectively engaged by the user to lock the stop assembly in the open position, the stop assembly locking device being configured to engage the housing assembly to lock the stop assembly in the open position.

37. A retractable tape rule assembly locking system, the system comprising:
- an elongated tape rule blade configured for measurement, the elongated tape rule blade including measurement indicia;
- a reel configured to retract the elongated tape rule blade from an extended position to a wound position;
- a spring configured to apply a rotational bias to the reel that rotates the reel to retract the elongated tape rule blade into the wound position;
- a stop assembly configured to selectively engage the elongated tape rule blade to maintain the elongated tape rule blade in the extended position or the wound position, the stop assembly configured to be moveable between a default position and an open position by a user,
  - wherein, while the stop assembly is in the default position, the stop assembly engages the elongated tape rule blade to prevent retraction of the elongated tape rule blade, and
  - wherein, while the stop assembly is in the open position, the stop assembly is disengaged from the elongated tape rule blade to allow retraction and extension of the elongated tape rule blade; and
- a housing assembly configured to house one or more of the reel, the spring, or at least a portion of the elongated tape rule blade,
  - wherein the housing assembly includes a fixed stop, and
  - wherein the stop assembly maintains the elongated tape rule blade in the extended position or the wound position responsive to a first side of the stop assembly engaging the fixed stop and a second side of the stop assembly engaging an extended portion of the elongated tape rule blade.

* * * * *